(12) United States Patent
Omori et al.

(10) Patent No.: US 7,811,355 B2
(45) Date of Patent: Oct. 12, 2010

(54) NIOBIUM POWDER FOR CAPACITOR, NIOBIUM SINTERED BODY AND CAPACITOR

(75) Inventors: Kazuhiro Omori, Kanagawa (JP); Hitoshi Amita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 926 days.

(21) Appl. No.: 10/578,784

(22) PCT Filed: Nov. 9, 2004

(86) PCT No.: PCT/JP2004/016918

§ 371 (c)(1), (2), (4) Date: Dec. 19, 2006

(87) PCT Pub. No.: WO2005/045860

PCT Pub. Date: May 19, 2005

(65) Prior Publication Data

US 2007/0137434 A1   Jun. 21, 2007

Related U.S. Application Data

(60) Provisional application No. 60/520,636, filed on Nov. 18, 2003.

(30) Foreign Application Priority Data

Nov. 10, 2003   (JP) ............................... 2003-380066

(51) Int. Cl.
*B22F 1/02* (2006.01)
*H01G 9/042* (2006.01)

(52) U.S. Cl. .......................... 75/252; 75/245; 361/528; 428/570

(58) Field of Classification Search .................. 75/252, 75/255, 245; 428/570; 361/528
See application file for complete search history.

(56) References Cited

U.S. PATENT DOCUMENTS

| | | | |
|---|---|---|---|
| 1,728,941 A | 9/1929 | Marden et al. | |
| 3,614,544 A | 10/1971 | Mosebach et al. | |
| 3,825,802 A * | 7/1974 | Kumagai et al. | 361/529 |
| 4,084,965 A | 4/1978 | Fry | |
| 4,154,609 A | 5/1979 | Hähn | |
| 4,229,217 A | 10/1980 | Hähn | |
| 4,687,632 A | 8/1987 | Hurd et al. | |
| 4,957,541 A * | 9/1990 | Tripp et al. | 75/245 |
| 6,136,062 A | 10/2000 | Löffelholz et al. | |
| 6,312,642 B1* | 11/2001 | Fife | 419/30 |
| 6,423,110 B1* | 7/2002 | Naito et al. | 75/232 |
| 6,802,884 B2* | 10/2004 | Simkins et al. | 75/245 |
| 2002/0064476 A1* | 5/2002 | Omori et al. | 419/61 |
| 2003/0110890 A1* | 6/2003 | He et al. | 75/363 |
| 2003/0170169 A1* | 9/2003 | Omori et al. | 423/592.1 |
| 2006/0279908 A1* | 12/2006 | Omori et al. | 361/528 |

FOREIGN PATENT DOCUMENTS

| | | |
|---|---|---|
| JP | 52-109409 | 9/1977 |
| JP | 4-362102 A | 12/1992 |
| JP | 10-242004 A | 9/1998 |
| JP | 2002-25864 A | 1/2002 |
| JP | 2003-123208 A | 4/2003 |
| WO | WO 00/15555 A1 | 3/2000 |
| WO | WO 00/15556 A1 | 3/2000 |
| WO | WO 00/49633 A1 | 8/2000 |
| WO | WO 01/06525 A1 | 1/2001 |
| WO | WO 01/26123 A1 | 4/2001 |
| WO | WO 01/35428 A1 | 5/2001 |
| WO | WO 02/15208 A1 | 2/2002 |
| WO | WO 02/064858 A1 | 8/2002 |
| WO | WO 02/093596 A1 | 11/2002 |

* cited by examiner

*Primary Examiner*—Roy King
*Assistant Examiner*—Ngoclan T Mai
(74) *Attorney, Agent, or Firm*—Sughrue Mion, PLLC

(57) ABSTRACT

The present invention relates to niobium powder for a capacitor, comprising a niobium layer and a mixed layer of silicon nitride and niobium, the mixed layer being present in the vicinity of the powder particle surface; granulated niobium powder thereof; a niobium sintered body using the niobium powder and the granulated powder; and a capacitor using the sintered body as one electrode. The niobium powder for a capacitor of the present invention enables to produce a niobium capacitor having a high capacitance, a low leakage current, a low ESR and good tan δ characteristics and being excellent particularly in the properties of the breakdown voltage and soldering heat resistance.

49 Claims, 6 Drawing Sheets

NIOBIUM POWDER FOR CAPACITOR, NIOBIUM SINTERED BODY AND CAPACITOR

CROSS REFERENCE TO THE RELATED APPLICATIONS

This is an application filed pursuant to 35 U.S.C. Section 111(a) with claiming the benefit of U.S. Provisional application Ser. No. 60/520,636 filed Nov. 18, 2003 under the provision of 35 U.S.C. Section 111(b), pursuant to 35 U.S.C. Section 119(e) (1).

TECHNICAL FIELD

The present invention relates to a niobium powder, a sintered body using the niobium powder, a capacitor using the sintered body and production methods thereof.

BACKGROUND ART

With the progress of small-size, high-speed and light-weight electronic devices such as cellular phones and personal computers, the capacitor used for these electronic devices is demanded to have a smaller size, a larger capacitance and a lower ESR.

Among these capacitors, a tantalum capacitor has a large capacitance for its size and also has good performance and therefore, this capacitor is preferably used.

In order to increase the capacitance of a tantalum capacitor, it is necessary to increase the amount of the powder used or use a sintered body increased in the surface area by finely pulverizing the tantalum powder.

In the method of increasing the amount of the powder used, a large-size capacitor structure inevitably results and the demand for reduction in the size and weight cannot be satisfied. Also, in the method of increasing the surface area by finely pulverizing the tantalum powder, the pore diameter of the tantalum sintered body decreases and a high-capacitance tantalum capacitor cannot be produced or ESR cannot be decreased.

In order to overcome these defects, a capacitor obtained from a sintered body using a powder material having a higher dielectric constant than that of tantalum and having a low density has been proposed. Niobium is attracting attention as the material having a high dielectric constant.

A niobium capacitor is produced in the same manner as a tantalum capacitor.

A sintered body of niobium powder is generally used as the anode material of the niobium capacitor. For example, a niobium powder is granulated by mixing fine niobium powder with a liquid binder and then shaped by compression shaping and after implanting an anode lead therein, the shaped article is sintered at a high temperature in a high vacuum to produce an electrode called a niobium anode sintered body. The surface of this niobium anode sintered body is electrolytically oxidized (electro-chemically formed) to produce an electrically non-conducting insulating layer (insulating oxide layer of niobium), a counter electrode layer (cathode layer) such as manganese dioxide and electrically conducting polymer is formed on the electrically non-conducting insulating layer, a carbon paste, a silver paste and the like are sequentially stacked thereon, and the entirety is jacket-molded with a material such as epoxy resin, whereby a niobium capacitor is fabricated.

The niobium capacitor is inferior in the stability as compared with the tantalum capacitor.

More specifically, the insulating oxide layer of tantalum, which is produced by electrolytic oxidation, is formed of only tantalum pentoxide and has very high stability. On the other hand, niobium forms an insulating oxide layer comprising mainly niobium pentoxide containing a stable semiconducting suboxide (e.g., niobium dioxide, niobium monoxide) and therefore, the electrical stability is poor, which appears, for example, in increase of leakage current value or decrease of breakdown voltage (ratio of electrochemical voltage/operation voltage).

Furthermore, the increase in the thickness of tantalum pentoxide at the electrochemical formation is about 2 nm/V, whereas the increase in the thickness of niobium pentoxide at the electrochemical formation is as large as about 3.7 nm/V. Therefore, the insulating oxide layer comprising mainly niobium pentoxide is weak against mechanical or thermal stimulation and is readily broken. Particularly, when an electrically conducting polymer is used for the counter electrode, the increase of leakage current at the jacket-molding using a material such as epoxy resin, and the increase of leakage current caused by solder reflow at mounting on the substrates come out as a serious problem. In recent years, lead-free soldering is increasingly demanded and the elevation of solder reflow temperature to cope with this demand causes more increase in the leakage current value of niobium capacitor. In this way, because of its low breakdown voltage, the niobium capacitor is limited in its use to fields where the operation voltage is low and the leakage current does not affect.

In order to overcome these problems, various approaches have been proposed.

JP-A-10-242004 (the term "JP-A" as used herein means an "unexamined published Japanese patent application") describes a technique of partially nitriding niobium powder to improve the leakage current value of a niobium capacitor.

WO00/49633 and WO01/6525 describe a technique of limiting the total content of specific elements of Fe, Ni, Co, Si, Na, K and Mg to 350 ppm or less, and thereby improving the fluctuation in the leakage current value of a niobium capacitor.

WO00/15555 and WO00/15556 describe niobium oxide powder reduced in oxygen, which is used for a capacitor and obtained by partially reducing niobium oxide in the presence of an oxygen getter metal. These publications disclose the properties of the anode but do not describe a production example of a capacitor.

WO02/15208 and WO02/93596 describe a technique of incorporating or alloying other elements into niobium or niobium monoxide powder, and thereby decreasing the leakage current value of a capacitor. These publications do not describe the breakdown voltage and the soldering heat resistance.

WO01/35428 describes a technique of coating the niobium powder surface with elements Al, Si, Ti, Zr, Mo, W, Y and Ta and incorporating metals of Al, Si, Ti, Zr, Mo, W, Y and Ta into the niobium oxide barrier layer. This publication discloses the properties of the anode produced from this niobium powder but does not describe a production example of a capacitor.

WO01/26123 describes a composition where a part or the majority of niobium surface is covered with a compound having a silicon-oxygen bond or with a silicon-containing compound capable of producing a silicon-oxygen bond through hydrolysis, condensation, oxidation, thermal reaction or the like. This publication discloses that the compound having a silicon-oxygen bond is taken into the oxide dielectric film at the electrochemical formation and the leakage current value and deterioration in capacitance of niobium capacitor are reduced, but does not refer to the breakdown voltage and the soldering heat resistance.

In this way, various attempts have been made, but the improvement is not yet satisfactory and enhancement of breakdown voltage and soldering heat resistance is particularly demanded.

DISCLOSURE OF THE INVENTION

An object of the present invention is to provide a niobium capacitor having a high capacitance, a low leakage current, a low ESR and good tan δ characteristics as well as good properties particularly in the breakdown voltage and soldering heat resistance; a niobium powder for a capacitor and a niobium sintered body, which can produce the above-described niobium capacitor; and production methods thereof.

The present inventors have found that when a sintered body of a niobium powder comprising in the vicinity of the surface thereof a mixed layer of silicon nitride and niobium or a sintered body of a granulated powder of the above-mentioned niobium powder is used as a sintered body for the anode of a capacitor, a high-capacitance capacitor with good leakage current characteristics, ESR characteristics and tan δ characteristics and additionally, with excellent breakdown voltage characteristics and soldering heat resistance can be obtained. The present invention has been accomplished based on this finding.

The present invention provides niobium powder for a capacitor, granulated niobium powder for a capacitor, a niobium sintered body for a capacitor, a capacitor and production methods thereof, which are set forth below.

1. A niobium powder for a capacitor, comprising a niobium layer and a mixed layer of silicon nitride and niobium, the mixed layer being present in the vicinity of the powder particle surface.

2. The niobium powder for a capacitor as described in 1 above, wherein the thickness of the mixed layer is from 8 to 2,000 nm.

3. The niobium powder for a capacitor as described in 1 above, wherein the silicon nitride content is from 50 to 500,000 mass ppm.

4. The niobium powder for a capacitor as described in 1 above, wherein the silicon nitride is a compound represented by $Si_\alpha N_\beta$, wherein $\alpha$ and $\beta$ each represents a positive integer.

5. The niobium powder for a capacitor as described in 4 above, wherein the silicon nitride is at least one member selected from SiN, $Si_2N_2$, $Si_2N_3$ and $Si_3N_4$.

6. The niobium powder for a capacitor as described in 1 above, wherein the niobium in the niobium layer and the mixed layer is at least one member selected from pure niobium, a niobium compound, a niobium alloy and a hydride thereof.

7. The niobium powder for a capacitor as described in 6 above, wherein the niobium compound is at least one member selected from niobium hydride, niobium nitride and niobium oxide.

8. The niobium powder for a capacitor as described in 1 above, wherein the average particle size is from 0.05 to 5 μm.

9. The niobium powder for a capacitor as described in 1 above, wherein the specific surface area is from 0.5 to 70 $m^2/g$.

10. A method for producing a niobium powder for a capacitor, comprising a step of etching a niobium powder, a step of impregnating the etched pores with silicon nitride, and a step of closing the etched pores.

11. The production method of a niobium powder for a capacitor as described in 10 above, wherein the niobium powder is a primary powder having an average particle size of 0.05 to 5 μm, or an aggregated or granulated powder thereof.

12. The production method of a niobium powder for a capacitor as described in 10 above, which comprises a step of doping at least one element selected from the group consisting of nitrogen, oxygen, phosphorus, sulfur, selenium and tellurium, after the etching step but before the impregnation step, after the impregnation step but before the closing step, or after the closing step.

13. The production method of a niobium powder for a capacitor as described in 10 above, wherein the step of closing etched pores is performed in the presence of niobium, a niobium compound, niobium alloy or hydride thereof having an average particle size of 1 to 200 nm.

14. The production method of a niobium powder for a capacitor as described in 10 above, wherein the niobium powder is at least one member selected from niobium, a niobium compound, a niobium alloy and a hydride thereof.

15. The production method of a niobium powder for a capacitor as described in 14 above, wherein the niobium compound is a niobium compound containing nitrogen and/or oxygen.

16. The production method of a niobium powder for a capacitor as described in 10 above, wherein the etching agent for use in the etching step is an acid or an alkali.

17. The production method of a niobium powder for a capacitor as described in 16 above, wherein the etching agent is an acid solution containing hydrofluoric acid or fluoroacetic acid.

18. The production method of a niobium powder for a capacitor as described in 16 above, wherein the etching agent is an alkali solution having a pH of 10 or more.

19. The production method of a niobium powder for a capacitor as described in 10 above, wherein the silicon nitride impregnated is a particle having an average particle size of 1 to 200 nm.

20. The production method of a niobium powder for a capacitor as described in 10 above, wherein ultrasonic irradiation is performed in the impregnation step.

21. A granulated niobium powder for a capacitor, obtained by granulating the niobium powder for a capacitor described in any one of 1 to 9 above.

22. A granulated niobium powder for a capacitor, comprising a niobium layer and a mixed layer of silicon nitride and niobium, the mixed layer being present in the vicinity of the outer surface and in the vicinity of the in-pore surface.

23. The granulated niobium powder for a capacitor as described in 22 above, wherein the thickness of the mixed layer is from 8 to 2,000 nm.

24. The granulated niobium powder for a capacitor as described in 22 above, wherein the silicon nitride content is from 50 to 500,000 mass ppm.

25. The granulated niobium powder for a capacitor as described in 21 or 22 above, wherein the average particle size is from 5 to 1,000 μm.

26. The granulated niobium powder for a capacitor as described in 21 or 22 above, wherein the specific surface area is from 0.5 to 40 $m^2/g$.

27. The granulated niobium powder for a capacitor as described in 21 or 22 above, wherein one or more peak(s) of the pore diameter distribution is present in the range of 0.01 to 500 μm.

28. The granulated niobium powder for a capacitor as described in 25 above, wherein at least one peak of the pore diameter distribution is present in the range of 0.1 to 0.9 μm and at least one peak is present in the range of 0.9 to 3 μm.

29. A niobium sintered body for a capacitor, obtained by sintering the niobium powder for a capacitor described in any one of 1 to 9 above.

30. A niobium sintered body for a capacitor, obtained by sintering the granulated niobium powder for a capacitor described in any one of 21 to 28 above.

31. A niobium sintered body for a capacitor, comprising a niobium layer and a mixed layer of silicon nitride and niobium, the mixed layer being present in the vicinity of the outer surface of the sintered body and in the vicinity of the in-pore surface.

32. The niobium sintered body for a capacitor as described in 31 above, wherein the thickness of the mixed layer is from 8 to 2,000 nm.

33. The niobium sintered body for a capacitor as described in 31 above, wherein the silicon nitride content is from 50 to 500,000 mass ppm.

34. The niobium sintered body for a capacitor as described in any one of 29 to 31 above, wherein the porosity is 55 vol % or more.

35. The niobium sintered body for a capacitor as described in any one of 29 to 31 above, wherein the specific surface area is 0.006 m$^2$/mm$^3$ or more.

36. The niobium sintered body for a capacitor as described in any one of 29 to 31 above, wherein the specific surface area is from 0.005 m$^2$/mm$^3$ to 0.06 m$^2$/mm$^3$.

37. The niobium sintered body for a capacitor as described in any one of 29 to 31 above, wherein one or more peak of the pore diameter distribution is present in the range of 0.01 to 100 μm.

38. The niobium sintered body for a capacitor as described in 37 above, wherein at least one peak of the pore diameter distribution is present in the range of less than 1.0 μm and at least one peak is present in the range of 1.0 μm or more.

39. The niobium sintered body for a capacitor as described in any one of 29 to 31 above, wherein the volume of pores having a diameter of 1 μm or more is 13 vol % or more of the entire pore volume.

40. The niobium sintered body for a capacitor as described in any one of 29 to 31 above, wherein the capacitance is from 40,000 to 400,000 μFV/g.

41. A capacitor comprising the niobium sintered body for a capacitor described in any one of 29 to 40 above as one electrode, a counter electrode and a dielectric material intervening between the electrodes.

42. The capacitor as described in 41 above, wherein the dielectric material mainly comprises niobium oxide containing silicon nitride.

43. A capacitor comprising a sintered body for a capacitor as one electrode, a counter electrode and a dielectric material intervening between the electrodes, wherein the dielectric material mainly comprises niobium oxide containing silicon nitride.

44. The capacitor as described in 41 or 43 above, wherein the material for the counter electrode is at least one material selected from the group consisting of an electrolytic solution, an organic semiconductor and an inorganic semiconductor.

45. The capacitor as described in 44 above, wherein the organic semiconductor is at least one member selected from the group consisting of an organic semiconductor comprising benzopyrroline tetramer and chloranil, an organic semiconductor mainly comprising tetrathiotetracene, an organic semiconductor mainly comprising tetracyano-quinodimethane, and an electrically conducting polymer.

46. The capacitor as described in 45 above, wherein the electrically conducting polymer is at least one member selected from polypyrrole, polythiophene, polyaniline and substitution derivatives thereof.

47. The capacitor as described in 45 above, wherein the electrically conducting polymer is an electrically conducting polymer obtained by doping a dopant into a polymer containing a repeating unit represented by the following formula (1) or (2):

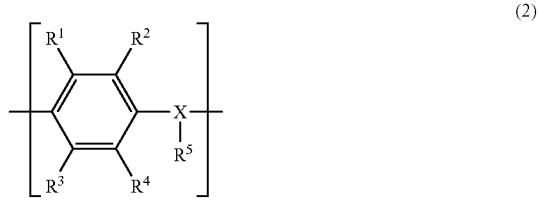

wherein $R^1$ to $R^4$ each independently represents a monovalent group selected from a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^1$ and $R^2$, or $R^3$ and $R^4$ may combine with each other at an arbitrary position to form a divalent group for forming at least one 3-, 4-, 5-, 6- or 7-membered saturated or unsaturated hydrocarbon cyclic structure together with the carbon atoms to which these substituent groups are bonded, the cyclic combined chain may contain, at an arbitrary position thereof, a carbonyl bond, an ether bond, an ester bond, an amido bond, a sulfido bond, a sulfinyl bond, a sulfonyl bond or an imino bond, X represents an oxygen atom, a sulfur atom or a nitrogen atom, and $R^5$ is present only when X is a nitrogen atom, and represents a hydrogen atom or a linear or branched, saturated or unsaturated alkyl group having from 1 to 10 carbon atoms.

48. The capacitor as described in 47 above, wherein the electrically conducting polymer is an electrically conducting polymer obtained by doping a dopant into a polymer containing a repeating unit represented by the following formula (3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

49. The capacitor as described in 48 above, wherein the electrically conducting polymer is an electrically conducting polymer obtained by doping a dopant into poly(3,4-ethylenedioxythiophene).

50. The capacitor as described in 41 or 43 above, wherein the material for the counter electrode has a layered structure at least in a partial portion.

51. The capacitor as described in 41 or 43 above, wherein the material for the counter electrode contains an organosulfonate anion as a dopant.

52. An electronic circuit using the capacitor described in any one of 41 to 51 above.

53. An electronic device using the capacitor described in any one of 41 to 51 above.

NIOBIUM POWDER FOR A CAPACITOR

By using the niobium powder for a capacitor of the present invention, a niobium capacitor excellent particularly in the breakdown voltage and soldering heat resistance can be obtained. The reasons therefor are not specifically known but are assumed as follows.

It is confirmed from a TEM (transmission-type electron microscope) image of the cross section of a powder particle and EPMA (electron probe microanalysis) that the niobium powder for a capacitor of the present invention consists of two layers of a layer comprising a mixture of silicon nitride and niobium formed in the region from the vicinity of the surface to the center of a powder particle and a layer comprising niobium formed in the particle center part. Also in the granulated powder and sintered body produced by the method described later, it is confirmed from the analysis of their cross section that the two-layer structure is maintained.

Figure 1:
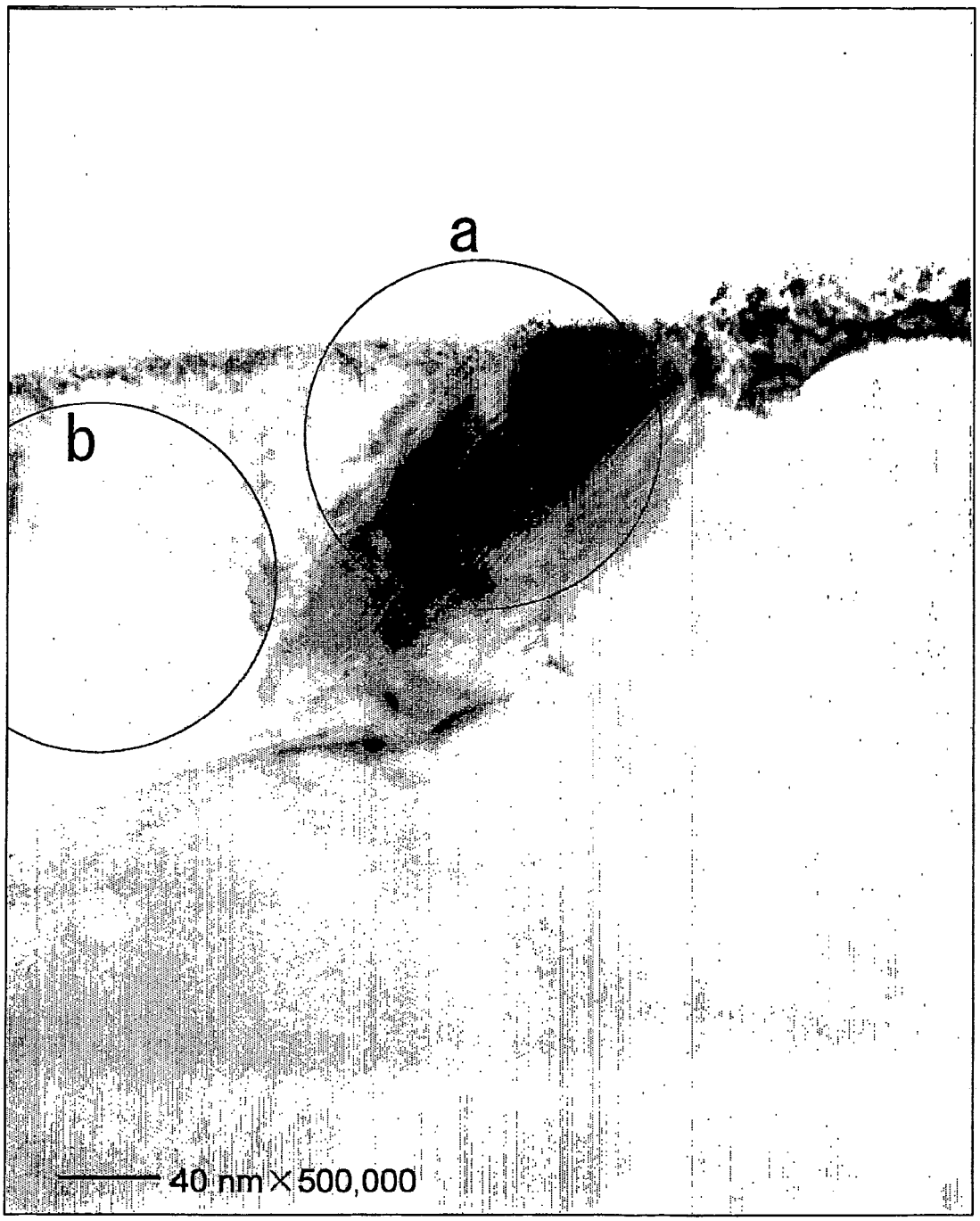
FIG. 1 is a TEM photograph of the mixed layer existing in the sintered body.
Figure 2:
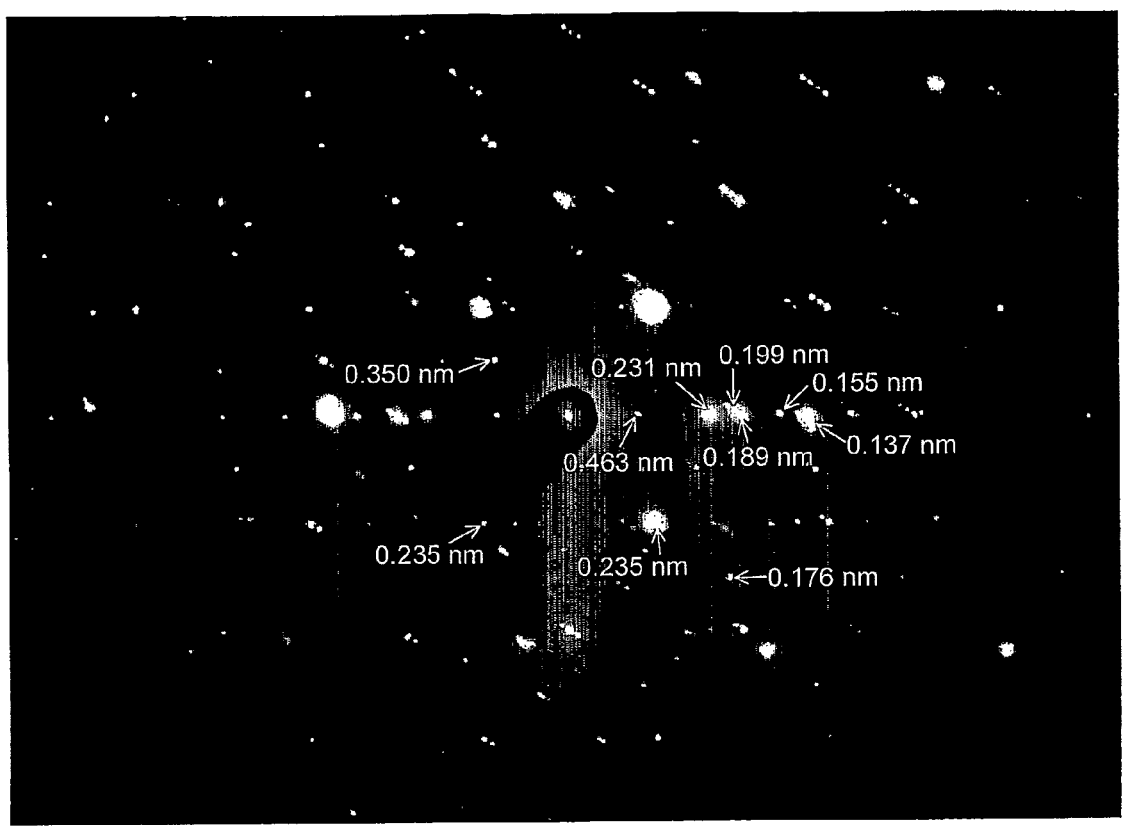
FIG. 2 is an electron diffraction image of part (a) in FIG. 1 (a mixed layer of silicon nitride and niobium).
Figure 3:
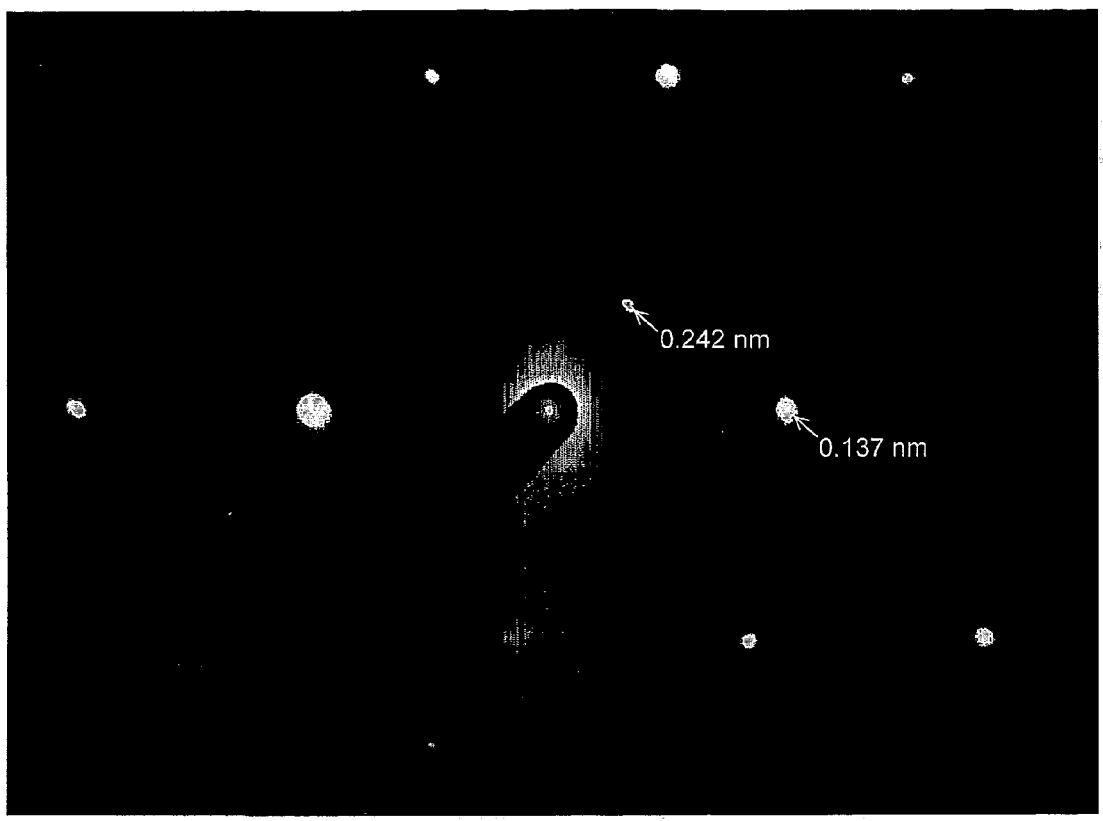
FIG. 3 is an electron diffraction image of part (b) in FIG. 1 (a niobium layer).
Figure 4:
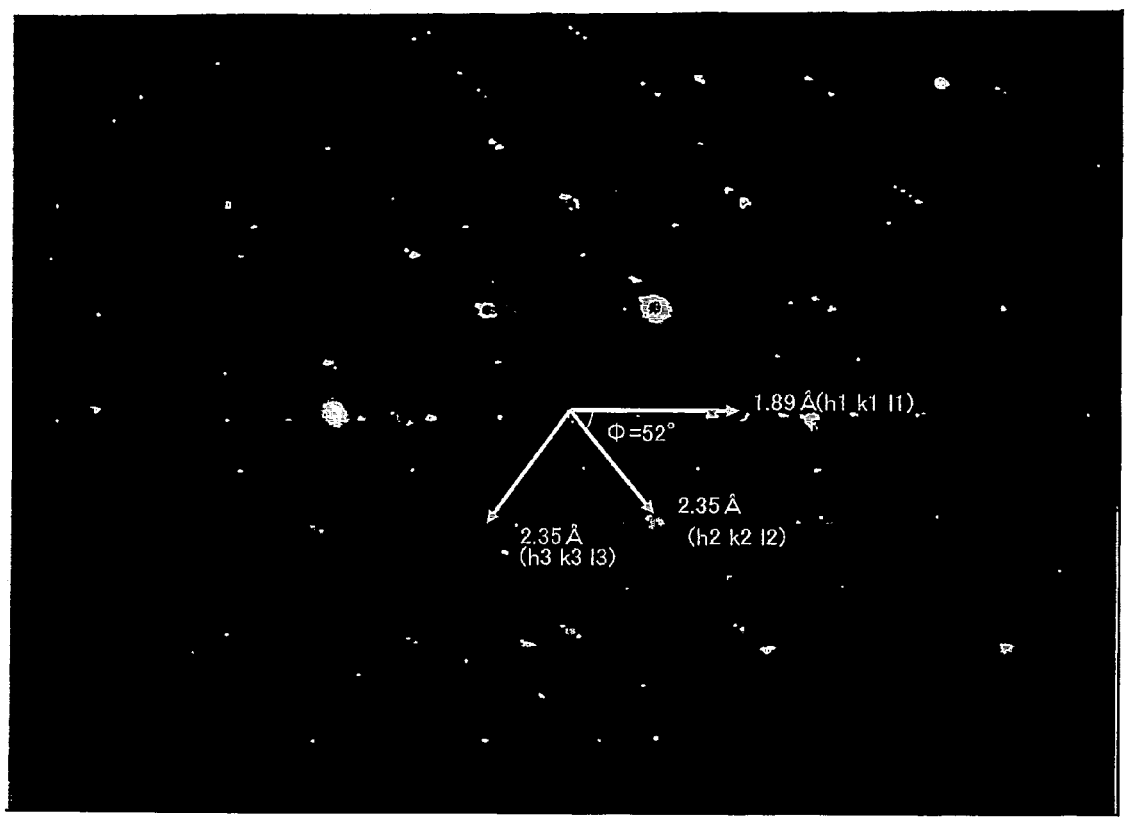
FIG. 4 is an electron diffraction image of silicon nitride.

FIG. 1 shows an example of a TEM photograph of the mixed layer existing in the sintered body. The results of the electron diffraction of parts (a) and (b) in FIG. 1 are shown in FIG. 2 and FIG. 3. FIG. 4 shows a diffraction pattern of silicon nitride. From comparison of these figures, both of diffraction patterns of silicon nitride and niobium were shown in part (a) of FIG. 1, and it was confirmed that part (a) is a mixed layer thereof.

When a sintered body produced from the niobium powder for a capacitor of the present invention is electrolytically oxidized, an insulating oxide layer is formed. From the analysis of the cross section of this electrochemically formed product (electrolytically oxidized niobium sintered body), it was confirmed that silicon nitride is present also in the insulating oxide layer. Therefore, the niobium powder for a capacitor of the present invention is considered to form a novel insulating oxide layer excellent in the breakdown voltage and soldering heat resistance as compared with an insulating layer comprising only niobium oxide. Particularly, silicon nitride represented by the molecular formula $Si_3N_4$ gives good breakdown voltage and soldering heat resistance. This is considered to result because the silicon nitride represented by the molecular formula $Si_3N_4$ has a high ability of forming a solid solution with various oxides.

In the niobium powder of the present invention, the thickness of the mixed layer of silicon nitride and niobium is important, because silicon nitride in an amount sufficiently large to enhance the breakdown voltage and soldering heat resistance must be contained in the insulating oxide layer which is the electrochemically formed product. The insulating oxide layer produced by the electrochemical formation of niobium is said to develop in a thickness of about 26% on the outer side from the original niobium metal interface and in a thickness of about 74% on the inner side, and the majority of the insulating oxide layer is produced on the inner side from the original niobium metal interface (see, Hyomen Gijutsu (Surface Technology), Vol. 54, No. 7, page 447 (2003)). Accordingly, the mixed layer of silicon nitride and niobium preferably has a thickness equal to or greater than the thickness of this insulating oxide layer produced on the inner side. In producing a niobium solid electrolytic capacitor, the electrochemical formation is generally performed at a voltage of 3 to 150 V, preferably from 5 to 100 V, more preferably from 10 to 80 V, and most preferably from 13 to 70 V. As described above, the niobium insulating oxide film grows in a thickness of about 3.7 nm/electrochemical voltage and by the electrochemical formation at 3 V, a niobium insulating oxide film having a thickness of about 11 nm is produced, where the thickness on the inner side from the original niobium metal interface is about 8 nm. Therefore, the thickness of the mixed layer of silicon nitride and niobium is preferably 8 nm or more, more preferably 13 nm or more, still more preferably 27 nm or more, yet still more preferably 35 nm or more.

The upper limit of the thickness of the mixed layer is theoretically the radius of a niobium powder particle, but a too large thickness incurs reduction of capacitance and therefore, the thickness of the mixed layer is preferably at most about ⅘ of the radius of a niobium particle. For example, the maximum thickness is about 2,000 nm when the average particle size of niobium powder is 5 μm, about 1,200 nm when the average particle size is 3 μm, about 400 nm when the average particle size is 1 μm, about 320 nm when the average particle size is 0.8 μm, about 200 nm when the average particle size is 0.5 μm, about 120 nm when the average particle size is 0.3 μm, about 80 nm when the average particle size is 0.2 μm, about 40 nm when the average particle size is 0.1 μm, and about 20 nm when the average particle size is 0.05 μm. As the average particle size becomes smaller, the electrochemical voltage capable of forming a niobium insulating oxide film imparted with an effect of enhancing the breakdown voltage and soldering heat resistance becomes lower. For example, the electrochemical voltage necessary for giving an effect of enhancing the breakdown voltage and soldering heat resistance is up to 146 V when the average particle size is 1.0 μm, up to 73 V when the average particle size is 0.5 μm, and up to 44 V when the average particle size is 0.3 μm.

In the niobium powder of the present invention, the mixed layer of silicon nitride and niobium is a layer where silicon nitride in the form of fine particles dispersedly exists in the niobium layer. The term "the mixed layer of silicon nitride and niobium being present in the vicinity of the powder particle surface" means a state that silicon nitride (fine particles) is embeddedly dispersed in the region from the niobium powder particle surface to a certain depth.

In the niobium powder of the present invention, the layer present in the vicinity of the surface must be a mixed layer of silicon nitride and niobium. The silicon nitride is an insulator and therefore, if a layer of silicon nitride alone is present on the surface, the electrochemical formation cannot be satisfactorily performed and only an unstable insulating oxide film of niobium is formed.

The silicon nitride content can be determined from the silicon content measured by ICP analysis and the nitrogen content measured by an nitrogen-oxygen analyzer.

The silicon nitride content varies depending on the particle size of powder, the thickness of the mixed layer of silicon nitride and niobium, the surface area or the like. An object of the present invention is to enhance the breakdown voltage and soldering heat resistance by stabilizing the insulating oxide film of niobium formed by the electrochemical formation on the surface of a niobium sintered body produced from a niobium powder and therefore, a sufficiently large amount of silicon nitride must be contained per surface area of the powder.

According to the present invention, in a powder particle having a specific surface area of 0.5 to 70 m²/g, silicon nitride is preferably contained in an amount of 50 mass ppm or more as determined by the powder analysis. If the silicon nitride content is less than 50 mass ppm, the effect of enhancing the breakdown voltage and soldering heat resistance can be hardly obtained, whereas if it exceeds 500,000 mass ppm, the niobium content becomes small and the capacitance decreases. Accordingly, the silicon nitride content is preferably from 50 to 500,000 mass ppm, more preferably from 100 to 400,000 mass ppm, still more preferably from 150 to 300,000 mass ppm, yet still more preferably from 200 to 200,000 mass ppm.

In the present invention, any silicon nitride can be suitably used as long as it is a compound consisting of nitrogen and silicon, represented by the following formula (4). These compounds can be used individually or in combination of two or more thereof.

$$Si_\alpha N_\beta \tag{4}$$

wherein α and β each represents a positive integer.

Specific examples of the compound represented by formula (4) include $SiN$, $Si_2N_2$, $Si_2N_3$ and $Si_3N_4$.

This compound takes a form such as amorphous, non-crystalline, vitrified, colloidal, solution or a crystal. In the case where this compound is granulated and used as a relatively large particle, an oxide such as magnesium oxide and yttrium oxide may be contained as a granulating agent.

In the niobium powder obtained according to the production method of the present invention described later, silicon nitride is enclosed in an etched pit (pore) formed in a niobium particle and thereby a mixed layer of silicon nitride and niobium is formed. Accordingly, the silicon nitride is preferably a particle usually having a particle size of 1 to 200 nm, more preferably from 1 to 100 nm, still more preferably from 1 to 50 nm, though this may vary depending on the size and depth of the etched pit size. The particle is not particularly limited in its shape and may be, for example, spherical, flat, columnar or flaked but a spherical shape is preferred because the particle can be easily introduced into the etched pit.

Other physical properties of the niobium powder of the present invention are preferably as follows:

| | |
|---|---|
| average particle size: | 0.05 to 5 μm |
| bulk density: | 0.2 to 3.5 g/ml |
| tapping density: | 0.2 to 3.0 g/ml |
| specific surface area: | 0.5 to 70 m²/g |

[Production of Niobium Powder for Capacitor]

The niobium powder for a capacitor of the present invention can be produced by a method comprising a step of etching niobium powder, a step of impregnating etched pits with silicon nitride, and a step of closing the etched pits.

The niobium for a capacitor used in the present invention is a substance mainly comprising niobium and usable as a material for producing a capacitor. This may be, in addition to pure niobium, for example, an electrically conducting (including semiconductor) niobium compound containing a component capable of alloying with niobium or a component such as nitrogen (50 to 50,000 ppm) and/or oxygen (2,000 to 200,000 ppm). Examples of the niobium compound containing nitrogen and/or oxygen include diniobium mononitride, niobium monooxide and/or hexaniobium monoxide. This compound usually takes a form such as amorphous, non-crystalline, vitrified, colloidal or a crystal. A hydride of such pure niobium, niobium alloy or niobium compound may also be used. Examples of the component other than niobium in the niobium alloy or niobium compound include at least one element selected from the group consisting of hydrogen, beryllium, magnesium, calcium, strontium, barium, scandium, yttrium, titanium, zirconium, hafnium, vanadium, tantalum, chromium, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, oxygen, sulfur, selenium, tellurium, lanthanum, cerium, praseodymium, neodymium, samarium, europium, gadolinium, terbium, dysprosium, holmium, erbium, thulium, ytterbium and lutetium. A step of doping at least one element selected from the group consisting of nitrogen, oxygen, boron, phosphorus, sulfur, selenium and tellurium may also be provided before the step of impregnating silicon nitride after the niobium powder for use in the present invention is etched, before the step of closing etched pits after silicon nitride is impregnated, or before and after the step of closing etched pits. The doping of nitrogen is performed, for example, by gas nitridation, ion nitridation or solid nitridation. Among these, gas nitridation is preferred because nitrogen can be uniformly distributed on the surface of niobium particles.

As for the niobium powder used in the production of the niobium powder for a capacitor, a primary powder having an average particle size of 0.05 to 5 μm, aggregated powder, granulated powder or the like can be suitably used. This niobium powder can be suitably used irrespective of the shape such as spherical, bar-like, flat or flaked. In order to obtain a niobium sintered body for a capacitor having a higher capacitance, niobium powder having less heat history and a large specific surface area is preferably used. Therefore, primary powder is preferred as the raw material niobium powder.

Such niobium powder can be prepared by using a known method such as a method of producing niobium powder, niobium compound powder or niobium alloy powder by pulverizing described, for example, in U.S. Pat. No. 4,084,965, JP-A-10-242004 and JP-A-2002-25864, or a method of producing niobium powder by reducing niobium oxide or niobium halide described, for example, in U.S. Pat. Nos. 1,728, 941 and 4,687,632 and JP-A-2000-119710 (U.S. Pat. No. 6,136,062).

This raw material niobium powder is etched to form etched pits (pores). The etching is preferably chemical etching using an alkaline solution or an acidic solution. Alkaline solutions or acidic solutions may be used in combination.

Examples of the alkaline solution which can be used include an alkali metal solution, an alkaline earth metal solution, an amine solution, an ammonia solution and a quaternary ammonium salt solution. These solutions may be also used as a mixture. As for the medium, an organic solvent such as alcohols, ketones, ethers, cellosolves, aliphatic hydrocarbons, aromatic hydrocarbons, halogenated hydrocarbons, DMSO (dimethylsulfoxide) and DMF (dimethylformamide), or water can be used. These solvents may also be used as a mixture. The alkali used for etching must be removed sufficiently. For this removal, distillation under reduced pressure is simple and preferred. Accordingly, an alkali agent having a vapor pressure at a relatively low temperature is preferred. For example, an ammonia solution, a methylamine solution or a dimethylamine solution is particularly preferred. The concentration of a substance showing alkalinity in the alkaline solution varies depending on the particle size of niobium powder, the reaction temperature or the like but is preferably from 0.1 to 50 mass %, more preferably from 1 to 30 mass %, still more preferably from 3 to 20 mass %.

Examples of the acidic solution which can be used include a hydrofluoric acid solution and a fluoroacetic acid solution. For controlling the etching reaction, a mixture with other acid such as nitric acid, sulfuric acid and hydrochloric acid may be used. For the medium the same organic solvents as those described for the alkaline solution, water, and a mixture thereof may be used. The concentration of hydrogen fluoride or fluoroacetic acid in the acidic solution is preferably from 0.01 to 30 mass %, more preferably from 0.1 to 10 mass %, still more preferably from 0.2 to 7 mass %.

The etching reaction under alkaline conditions proceeds slowly as compared with that under acidic conditions. The etching under alkali conditions is preferably performed under severer conditions. Accordingly, the pH is preferably 8 or more, more preferably 9 or more, still more preferably 10 or more.

The etching reaction is usually performed at a temperature from a freezing point of the alkaline or acidic solution to 100° C. for from one minute to 100 hours. In the case where the reaction proceeds at a high rate, the reaction is preferably performed at a lower temperature, but if the temperature is too low, the reaction is significantly retarded. Therefore, the reaction is preferably performed at a temperature of −100° C. to 80° C., more preferably from −30° C. to 60° C., still more preferably from −10° C. to 40° C.

After the completion of the etching reaction, the alkaline or acidic solution is washed and removed sufficiently with a solvent such as water. Thereafter, the niobium powder is dried at 80° C. or less under reduced pressure, whereby niobium powder having etched pits formed on the powder surface can be obtained. The etched pit size varies depending on the particle size of raw material niobium powder or the etching conditions but is usually from 5 to 200 nm.

Subsequently, the etched pits of this niobium powder are impregnated with silicon nitride. The above-described silicon nitride powder having an average particle size of 1 to 200 nm and the niobium powder having formed thereon etched pits are mixed sufficiently by using a device such as Nauter mixer and V-type mixer. When silicon nitride balls of 0.3 mm or more are allowed to coexist, this can enhance the mixing efficiency. The mixing is preferably performed for at least five minutes or more. Thereafter, ultrasonic wave is irradiated for from one second to ten hours to impregnate etched pits with the silicon nitride powder. When short-time irradiation and mixing of powders are repeated, impregnation is performed more efficiently than when irradiating ultrasonic wave for a long time. Usually, ultrasonic irradiation for ten seconds is performed preferably three times or more, more preferably ten times or more, still more preferably 20 times or more. The frequency of the ultrasonic wave is preferably 15 kHz or more, more preferably 20 kHz or more. The output thereof varies depending on the material, shape or size of container or the amount of niobium powder but usually, an output of 100 W or more is preferred. The mixing of silicon nitride and niobium powder having formed thereon etched pits and subsequent ultrasonic irradiation are usually performed at room temperature. In the case where the temperature is elevated to 50° C. or higher, the system is preferably cooled. There is no problem even when mixing and irradiation are performed at 0° C. or lower, but it is not economically preferred because equipment such as a refrigerator is necessary.

After the ultrasonic irradiation, the mixture of the niobium powder having etched pits thereof impregnated with silicon nitride powder and excess silicon nitride powder is dispersed in a solvent such as water. By utilizing the difference in the specific gravity and particle size between the niobium powder and silicon nitride, only the niobium powder was precipitated by centrifugation and the supernatant containing excess silicon nitride is decanted. The temperature at this time is preferably from 0 to 50° C. If the temperature exceeds 50° C., a reaction between water and niobium is liable to proceed, as a result, the oxygen concentration increases, which tends to inhibit the sinterability at the production of a sintered body. There is no problem in performing the centrifugation and decantation at lower than 0° C., but this is not economically preferred because equipment such as a refrigerator is necessary. An operation of further dispersing the resulting niobium powder in a solvent such as water and performing centrifugal precipitation and decantation may be repeated. As for the solvent in which the niobium powder is dispersed, an organic solvent such as alcohols, ketones, ethers, cellosolves, aliphatic hydrocarbons, aromatic hydrocarbons, halogenated hydrocarbons, DMSO (dimethylsulfoxide) and DMF (dimethylformamide), or water can be suitably used. These solvents may also be used as a mixture.

The thus-obtained niobium powder containing silicon nitride powder in etched pits, which is in a wet state, is thoroughly dispersed in a solvent and the resulting solution is charged together with niobium beads into a device such as a niobium-made pot mill, bead mill, shaking mixer or V-type mixer and vigorously mixed. At this time, the niobium powder containing silicon nitride powder in etched pits is violently caught between the niobium bead and the inner wall of mill and the niobium surface is deformed to close etched pits, whereby the silicon nitride is fixed to the niobium powder. The temperature at the vigorous mixing is preferably from 0 to 50° C. If the temperature exceeds 50° C., a reaction between water and niobium is liable to proceed, as a result, the oxygen concentration increases, which tends to inhibit the sinterability at the production of a sintered body. There is no problem in performing the vigorous mixing at lower than 0° C., but this is not economically preferred because equipment such as a refrigerator is necessary. The time spent for this vigorous mixing is usually from one minute to 1,000 hours. When a niobium compound such as niobium, niobium monoxide, hexaniobium monoxide, niobium dioxide, niobium pentoxide, niobium nitride and diniobium mononitride, a niobium alloy or a hydride thereof is added, the silicon nitride can be fixed to the niobium powder within a shorter time. In the case of adding such a compound, the time spent for the mixing is usually from one minute to 100 hours. As for the solvent in which the niobium powder is dispersed, an organic solvent such as alcohols, ketones, ethers, cellosolves, aliphatic hydrocarbons, aromatic hydrocarbons, halogenated hydrocarbons, DMSO (dimethylsulfoxide) and DMF (dimethylformamide), or water can be suitably used. These solvents may also be used as a mixture.

The niobium powder of the present invention where silicon nitride is enclosed by closing etched pits is, after separation of niobium beads, dried at 80° C. or lower under reduced pressure, if desired.

In the case of using a hydride for the raw material niobium powder or the niobium powder added for enclosing silicon nitride, a step of dehydrogenation may be provided before the step of etching niobium powder, before the step of impregnating etched pits with silicon nitride, or before and after the step of closing etched pits. The dehydrogenation may be performed at 200 to 900° C. under reduced pressure.

[Granulated Niobium Powder]

The granulated niobium powder for a capacitor of the present invention has a porous structure and is characterized in that a mixed layer of silicon nitride and niobium is present in the vicinity of the surface. Here, the vicinity of the surface includes both the outer surface and the in-pore surface.

The granulated niobium powder preferably has the following values:

| | |
|---|---|
| average particle size: | 10 to 1,000 µm |
| bulk density: | 0.4 to 2.3 g/ml |
| tapping density: | 0.5 to 2.5 g/ml |
| angle of repose: | 10 to 60° |
| thickness of silicon nitride and niobium layer: | 8 to 2,000 nm |
| silicon nitride content: | 50 to 500,000 mass ppm |
| pore diameter peak: | 0.01 to 500 µm |
| number of pore diameter peaks: | one or more |
| specific surface area: | 0.5 to 40 m$^2$/g |

Particularly, in the case of having two or more pore diameter peaks, it is preferred that at least one pore diameter peak is present in the range from 0.1 to 0.9 µm and at least one peak is present in the range from 0.9 to 3 µm.

The granulated niobium powder for a capacitor of the present invention can be produced by granulating the above-described niobium powder for a capacitor or a secondary aggregated powder thereof. As compared with the niobium primary powder or a secondary aggregated powder thereof, the granulated powder has good flowability and excellent handleability in view of production of a sintered body.

The granulation is generally performed by exposing the powder to heat at a temperature of about 400° C. to about 1,300° C. for from one minute to 100 hours under reduced pressure, thereby causing thermal aggregation. In particular, the granulated powder is preferably produced by the method of using an excipient described in WO02/093596 and WO02/092864. By this method, porous granulated niobium powder for a capacitor, where the pore diameter distribution is adjusted, can be easily obtained. The sintered body obtained by using this granulated powder ensures good impregnation of a cathode agent at the production of a capacitor and the capacitor obtained is stabilized in the electric characteristics.

[Sintered Body]

The niobium sintered body for a capacitor of the present invention has a porous structure and is characterized in that a mixed layer of silicon nitride and niobium is present in the vicinity of the surface including the vicinity of the pore surface. Preferred physical values are as follows:

| | |
|---|---|
| volume: | 0.3 to 1,000 mm$^3$ |
| density: | 2.5 to 4.0 g/ml |
| porosity: | 55 vol % or more |
| thickness of silicon nitride and niobium layer: | 8 to 2,000 nm |
| silicon nitride content: | 50 to 500,000 mass ppm |
| pore diameter peak top: | 0.01 to 100 µm |
| number of pore diameter peak tops: | one or more |
| specific surface area: | 0.005 m$^2$/mm$^3$ to 0.06 m$^2$/mm$^3$ |
| capacitance: | 40,000 to 400,000 µFV/g |

Particularly, in the case of having multiple pore diameter peaks, it is preferred that at least one pore diameter peak is present in the range of less than 1.0 µm and at least one peak is present in the range of 1 µm or more. Furthermore, the volume of pores having a diameter of 1 µm or more is preferably 13 vol % or more of the entire pore volume.

The niobium sintered body of the present invention can be produced by using the above-described niobium powder or granulated niobium powder according to a known method, that is, shaping the raw material power together with an outgoing lead wire under pressure into a predetermined shape by an automatic shaping machine and heating the shaped article under $10^{-5}$ to $10^2$ Pa for from one minute to 10 hours at from 500 to 2,000° C., preferably from 800 to 1,500° C., more preferably from 1,000 to 1,400° C.

In the case of using the above-described granulated niobium powder, any material can be suitably used for the material of the outgoing lead wire as long as it is niobium, a niobium compound or a niobium alloy, but a material having the same structure as that of the powder material is preferred. Accordingly, a niobium lead comprising a mixed layer of silicon nitride and niobium, where the mixed layer is present in the vicinity of the niobium lead surface, is preferably used. The reason therefor is because when the sintered body is electrochemically formed, a part of the lead wire is also electrochemically formed and the insulating oxide film formed on the lead wire must be also stabilized. The thickness of the mixed layer of silicon nitride and niobium and the content of silicon nitride are preferably about the same as those of the powder. The niobium sintered body of the present invention produced by using this method ensures good impregnation of a cathode agent at the production of a capacitor and the capacitor obtained is stabilized in the electric characteristics.

In the case of a sintered body having a relatively large size (10 mm$^3$ or more) and ensuring good impregnation, it may be produced by a method for producing a niobium sintered body electrode for a solid electrolytic capacitor, comprising sequentially performing a mixing step of mixing niobium powder for a capacitor, a pore-forming agent and an organic binder to obtain a mixture, a shaping step of compression-shaping the mixture to obtain a shaped article, a sintering step of sintering the shaped article to obtain a sintered body containing a pore-forming agent, and a removal step of removing the pore-forming agent contained in the sintered body (see, Japanese Patent Application No. 2003-123208 (PCT/JP2004/006102)). The niobium sintered body produced by this method has the physical properties shown above, and the specific surface area of the sintered body per volume, calculated from the specific surface area per mass and the density of sintered body, can be made to 0.01 m²/mm³ or more. In the case of a sintered body having a volume of about 20 m³, its capacitance can be 800 μF/unit or more, even 1,000 μF/unit or more. Also, even when the volume of the sintered body is increased to 50 mm³ and 100 mm³, the impregnation ratio of the cathode agent does not greatly decrease and a capacitor stabilized in ESR and excellent in the properties of the breakdown voltage and soldering heat resistance can be obtained.

[Capacitor]

The capacitor element is described below.

A capacitor can be produced comprising the above-described sintered body serving as one electrode, a counter electrode and a dielectric material intervening between these electrodes. For example, the niobium sintered body is used as one electrode, a dielectric material is formed on the surface (including in-pore surface) of the sintered body, and a counter electrode is provided on the dielectric material, whereby a capacitor is fabricated.

The dielectric material of the capacitor is preferably a dielectric material mainly comprising niobium oxide, more preferably a dielectric material mainly comprising niobium pentoxide. In the present invention, silicon nitride is contained in this dielectric layer and the physical properties are thereby improved.

The dielectric material mainly comprising niobium pentoxide can be obtained, for example, by electrolytically oxidizing the niobium sintered body serving as one electrode. The electrolytic oxidation of the niobium electrode in an electrolytic solution is usually performed by using an aqueous protonic acid solution, for example, an aqueous 0.1% phosphoric acid solution and an aqueous sulfuric acid solution, an aqueous 1% acetic acid solution or an aqueous adipic acid solution. When a niobium oxide dielectric material is obtained in this way by electrochemically forming the niobium electrode in an electrolytic solution, the capacitor of the present invention is an electrolytic capacitor and the niobium electrode serves as the anode.

In the capacitor of the present invention, the counter electrode of the niobium sintered body is not particularly limited and, for example, at least one material (compound) selected from electrolytic solutions, organic semiconductors and inorganic semiconductors known in the industry of aluminum electrolytic capacitors can be used. Particularly, when an organic semiconductor is used, the effect of enhancing the soldering heat resistance of the capacitor is profound. The reason therefor is presumed because the change due to heat, such as thermal expansion, is small in an inorganic semiconductor but large in an organic semiconductor.

Specific examples of the organic semiconductors include an organic semiconductor comprising benzopyrroline tetramer and chloranil, an organic semiconductor mainly comprising tetrathiotetracene, an organic semiconductor mainly comprising tetracyanoquinodimethane, and an electrically conducting polymer containing a repeating unit represented by the following formula (1) or (2):

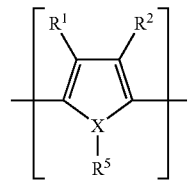

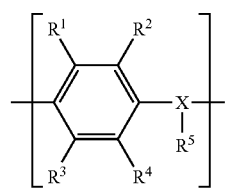

wherein $R^1$ to $R^4$ each independently represents a monovalent group selected from a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of $R^1$ and $R^2$, or $R^3$ and $R^4$ may combine with each other at an arbitrary position to form a divalent group for forming at least one 3-, 4-, 5-, 6- or 7-membered saturated or unsaturated hydrocarbon cyclic structure together with the carbon atoms to which these substituent groups are bonded; the cyclic combined chain may contain, at an arbitrary position thereof, a carbonyl bond, an ether bond, an ester bond, an amido bond, a sulfido bond, a sulfinyl bond, a sulfonyl bond or an imino bond; X represents an oxygen atom, a sulfur atom or a nitrogen atom; and $R^5$ is present only when X is a nitrogen atom, and represents a hydrogen atom or a linear or branched, saturated or unsaturated alkyl group having from 1 to 10 carbon atoms.

In the present invention, $R^1$ to $R^4$ in formulae (1) and (2) each independently represents preferably a hydrogen atom or a linear or branched, saturated or unsaturated alkyl or alkoxy group having from 1 to 6 carbon atoms, and each of the pairs of $R^1$ and $R^2$, and $R^3$ and $R^4$ may combine with each other to form a ring.

In the present invention, the electrically conducting polymer containing a repeating unit represented by formula (1) is preferably an electrically conducting polymer containing the structural unit represented by the following formula (3) as a repeating unit:

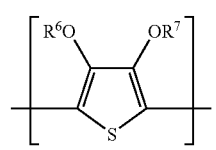

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position; and the cyclic structure includes a structure having a vinylene bond which may be substituted, and a phenylene structure which may be substituted.

The electrically conducting polymer containing such a chemical structure is doped with a dopant. For the dopant, known dopants can be used without limitation.

Specific examples of the inorganic semiconductors include an inorganic semiconductor mainly comprising lead dioxide or manganese dioxide, and an inorganic semiconductor comprising triiron tetroxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electric conductivity of $10^{-2}$ to $10^3$ S/cm, the capacitor produced can have a further smaller impedance value and further increased capacitance at a high frequency.

The electrically conducting polymer layer is produced, for example, by a method of polymerizing a polymerizable compound such as aniline, thiophene, furan, pyrrole, methylpyrrole or a substitution derivative thereof under the action of an oxidizing agent capable of causing a satisfactory oxidation reaction of dehydrogenative two-electron oxidation. The polymerization reaction from a polymerizable compound (monomer) includes, for example, vapor phase polymerization, solution polymerization and electrolytic polymerization of the monomer, and the polymer is formed on the surface of the niobium sintered body having thereon a dielectric material. In the case where the electrically conducting polymer is an organic solvent-soluble polymer capable of solution coating, a method of coating the solution on the surface is employed.

One preferred example of the production methods by solution polymerization is a method of dipping a niobium sintered body having formed thereon a dielectric layer in a solution containing an oxidizing agent (Solution 1) and then dipping the sintered body in a solution containing the monomer and a dopant (Solution 2), thereby performing polymerization to form an electrically conducting polymer layer on the surface of the sintered body. The sintered body may be dipped in Solution 2 and then in Solution 1. Also, Solution 2 may be a monomer solution not containing a dopant. In the case of using a dopant, the dopant may be rendered to coexist in the solution containing an oxidizing agent.

This operation of the polymerization step is repeated once or more, preferably from 3 to 20 times, for the niobium sintered body having thereon a dielectric material, whereby a dense and layered electrically conducting polymer layer can be easily formed.

In the production method of a capacitor of the present invention, any oxidizing agent may be used if it does not adversely affect the capacitor performance and the reductant of the oxidizing agent works out to a dopant and enhances the electric conductivity of the electrically conducting polymer. An industrially inexpensive compound easy to handle in view of production is preferred.

Specific examples of such an oxidizing agent include Fe(III) compounds such as $FeCl_3$, $FeClO_4$ and Fe (organic acid anion) salt, anhydrous aluminum chloride/cuprous chloride, alkali metal persulfates, ammonium persulfates, peroxides, manganeses such as potassium permanganate, quinones such as 2,3-dichloro-5,6-dicyano-1,4-benzoquinone (DDQ), tetrachloro-1,4-benzoquinone and tetracyano-1,4-benzoquinone, halogens such as iodine and bromine, peracid, sulfuric acid, fuming sulfuric acid, sulfur trioxide, sulfonic acids such as chlorosulfuric acid, fluorosulfuric acid and amidosulfuric acid, ozone, and combinations of a plurality of these oxidizing agents.

Examples of the base compound for the organic acid anion constituting the Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethane-sulfonic acid, α-sulfonaphthalene, β-sulfonaphthalene, naphthalenedisulfonic acid and alkylnaphthalenesulfonic acid (examples of the alkyl group include butyl, triiso-propyl and di-tert-butyl).

Specific examples of the organic carboxylic acid include acetic acid, propionic acid, benzoic acid and oxalic acid. Furthermore, in the present invention, a polymer electrolyte anion such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid may also be used. However, these are set forth only for the purpose of illustrating examples of the organic sulfonic acid and the organic carboxylic acid and the present invention is not limited thereto. Examples of the counter cation of the above-described anion include, but are not limited to, $H^+$, alkali metal ion such as $Na^+$ and $K^+$, and ammonium ion substituted by a hydrogen atom, a tetramethyl group, a tetraethyl group, a tetrabutyl group or a tetraphenyl group. Among these oxidizing agents, preferred are oxidizing agents containing a trivalent Fe compound, cuprous chloride, alkali persulfate, ammonium persulfate or quinone.

As for the anion (anion except for the reductant anion of the oxidizing agent) having a dopant ability which is allowed to coexist, if desired, in the process of producing a polymer composition of the electrically conducting polymer, an electrolyte anion having, as a counter anion, an oxidizing agent anion (a reductant of the oxidizing agent) produced from the above-described oxidizing agent, or other electrolyte anion may be used. Specific examples thereof include halide anion of Group 15 elements such as $PF_6^-$, $SbF_6^-$ and $AsF_6^-$, halide anion of Group 13 elements such as $BF_4^-$, halogen anion such as $I^-(I_3^-)$, $Br^-$ and $Cl^-$, perhalogenate anion such as $ClO_4^-$, Lewis acid anion such as $AlCl_4^-$, $FeCl_4^-$ and $SnCl_5^-$, and inorganic acid anion such as $NO_3^-$ and $SO_4^{2-}$, sulfonate anion such as p-toluenesulfonic acid, naphthalenesulfonic acid and naphthalenesulfonic acid substituted by an alkyl group having from 1 to 5 carbon atoms, organic sulfonate anion such as $CF_3SO_3^-$ and $CH_3SO_3^-$, and carboxylate anion such as $CH_3COO^-$ and $C_6H_5COO^-$.

Other examples include polymer electrolyte anion such as polyacrylic acid, polymethacrylic acid, polystyrenesulfonic acid, polyvinylsulfonic acid, polyvinylsulfuric acid, poly-α-methylsulfonic acid, polyethylenesulfonic acid and polyphosphoric acid. However, the present invention is not limited thereto. The anion is preferably a polymer or low molecular organic sulfonic acid compound anion or a polyphosphoric acid compound anion, and an aromatic sulfonic acid compound (e.g., sodium dodecylbenzenesulfonate, sodium naphthalenesulfonate) is preferably used as the anion-donating compound.

Among the organic sulfonate anions, more effective dopants are a sulfoquinone compound having one or more sulfo-anion group ($—SO_3^-$) and a quinone structure within the molecule, and an anthracenesulfonate anion.

Examples of the basic skeleton for the sulfoquinone anion in the sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

In the case where the counter electrode is solid, an electrically conducting layer may be provided thereon so as to attain good electric contact with an exterior outgoing lead (for example, lead frame), if desired.

The electrically conducting layer can be formed, for example, by the solidification of an electrically conducting paste, plating, vapor deposition of metal, or lamination of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, a carbon paste and a silver paste are stacked in this order on the second electrode and these are molded with a material such as epoxy resin, whereby a capacitor is fabricated. This capacitor may have a niobium or tantalum lead which is sintered and shaped integrally with the niobium sintered body or welded afterward.

The thus-fabricated capacitor of the present invention is jacketed by using, for example, resin mold, resin case, metallic jacket case, dipping of resin, or laminate film and then used as a capacitor product for various uses.

In the case where the counter electrode is liquid, the capacitor constituted by those two electrodes and a dielectric material is housed, for example, in a can electrically connected to the counter electrode, thereby completing the capacitor. In this case, the electrode side of the niobium sintered body is guided outside through a niobium or tantalum lead described above and at the same time, insulated from the can by using an insulating rubber or the like.

BEST MODE FOR CARRYING OUT THE INVENTION

The present invention is described in greater detail below by referring to Examples and Comparative Examples, but the present invention is not limited thereto.

In each Example, the content of silicon nitride, the thickness of the mixed layer of silicon nitride and niobium, and the capacitance, breakdown voltage and soldering heat resistance of the capacitor were measured and evaluated by the following methods.

(1) Content of Silicon Nitride

The amount of silicon was measured by using an ICP analyzer (ICPS-2000) manufactured by Shimadzu Corporation, the amount of nitrogen was measured by using an oxygen-nitrogen analyzer (EMGA-620W) manufactured by Horiba Ltd., and the total thereof was used as the content of silicon nitride (when niobium containing silicon or nitrogen was used as the raw material, the amount after subtracting the amount of silicon or nitrogen contained in the raw material was used as the content of silicon nitride).

Content of silicon nitride=(analytical value of silicon−amount of silicon contained in the raw material)+(analytical value of nitride−amount of nitrogen contained in the raw material)

(2) Thickness of the Mixed Layer of Silicon Nitride and Niobium

The thickness of the mixed layer of silicon nitride and niobium in the cross section of a powder particle was measured by a TEM measuring apparatus (HF-2200) manufactured by Hitachi, Ltd. and an EPMA measuring apparatus (JXA8900) manufactured by JEOL Ltd.

(3) Capacitance of the Capacitor

At room temperature, an LCR measuring apparatus (4294A) manufactured by Agilent Technologies was connected between the terminals of the produced chip capacitor, and the capacitance was measured with a bias of 1.5 V at 120 Hz.

(4) Breakdown Voltage of the Capacitor

The current value measured after each direct current voltage of 1 to 20 V was continuously applied at room temperature for one minute between the terminals of a chip capacitor produced by setting the electrolytic oxidation voltage to 20 V was used as a leakage current value of the capacitor fabricated into a chip. A graph was configured by taking the direct current voltage applied on the abscissa and the leakage current value on the ordinate, and the applied voltage at the inflection point of the leakage current value (when two or more inflection points were present, the voltage at the lowest inflection point) was regarded as a usable maximum voltage and compared among capacitors. As the voltage is higher, the breakdown voltage is judged to be better.

(5) Soldering Heat Resistance

The capacitor produced was mounted together with a solder on a stacked substrate having a thickness of 1.5 mm and passed three times through a reflow furnace and thereafter, the leakage current value (sometimes simply referred to as "LC") when a voltage of 6.3 V was applied was measured. The number of capacitors giving an LC value of 0.05 CV (C represents the capacitance of the capacitor and V represents the voltage applied) or less was counted. As the number of such capacitors is larger, the soldering heat resistance can be judged to be better. As for the reflow conditions, the maximum peak temperature was 260° C. and the temperature of 230° C. or more was kept for 60 seconds. In the reflow furnace, the capacitor was heated three times and the evaluation could be performed for the practical heat history (for example, heat history of three times when soldering packaging parts on the substrate surface, soldering packaging parts on the back surface and soldering parts attached later were performed).

(6) Average Particle Size

Using an apparatus manufactured by Microtrack (HRA 9320-X100), the particle size distribution was measured by the laser diffraction scattering method. A particle size value ($D_{50}$; μm) when the accumulated volume % corresponded to 50 volume % was designated as the average particle size.

(7) Bulk Density

The bulk density was measured according to a method using a densimeter for apparent density of powder specified in JIS (Japanese Industrial Standard, Edition of 2000) Z2504 and according to measuring instruments also specified therein.

(8) Tapping Density

The tapping density was measured according to a method using a tapping device among the measuring methods of apparent specific gravity of industrial sodium carbonate specified in JIS (Japanese Industrial Standard, Edition of 2000) K1201-1 and according to measuring instruments also specified therein.

(9) Angle of Repose

The angle of repose was measured using the flowability measuring instrument and the sample amount specified in JIS (Japanese Industrial Standard, Edition of 2000) Z2504. More specifically, niobium powder was dropped on a horizontal plane from the hopper whose lower end was at a height of 6 cm above the horizontal plane and the angle of the slant face from the apex of the circular cone generated to the horizontal plane was designated as the angle of repose.

(10) Pore Diameter Peak Top, Volume of Pores Having a Diameter of 1 μm or More Using AutoPore IV Porosimeter 9505 manufactured by Micro Meritics, the pore size distribution was measured by the mercury porosimetry method. In the present invention, the maximal value was determined from the rate of change in the press-fitted amount and the pore diameter shown at the maximal value was defined as the peak top. The volume of pore having a diameter of 1 μm or more was calculated by the accumulated volume of pores having a diameter of 1 μm.

(11) Specific Surface Area

The specific surface area ( ) was measured using NOVA1200 manufactured by QUANTACHROME INSTRUMENTS.

(12) Porosity

The porosity was calculated from the volume of the sintered body and the true density of the niobium powder.

In Examples 44 to 58 and Comparative Examples 1 to 6, the capacitor was produced by any one of the following production methods 1 to 4.

Capacitor Production Method 1:

100 units of a niobium anode sintered body having on the surface thereof an oxide dielectric film formed by electrolytic oxidation at a voltage of 20 V for 6 hours in an aqueous 0.1% phosphoric acid solution were prepared. Thereafter, an operation of dipping the sintered body in an aqueous 60% manganese nitrate solution and then heating it at 220° C. for 30 minutes was repeated to form a manganese dioxide layer as the counter electrode layer on the oxide dielectric film. On this counter electrode layer, a carbon layer and a silver paste layer were sequentially stacked and after placing a lead frame on the stacked body, the entirety was molded with epoxy resin to produce a chip capacitor.

Capacitor Production Method 2:

100 units of a niobium sintered body having on the surface thereof an oxide dielectric film formed by electrolytic oxidation at a voltage of 20 V for 6 hours in an aqueous 0.1% phosphoric acid solution were prepared. Thereafter, an operation of dipping the sintered body in a 1:1 (by volume) mixed solution of an aqueous 35% lead acetate solution and an aqueous 35% ammonium persulfate solution and then allowing the reaction to proceed at 40° C. for one hour was repeated to form a mixed layer of lead dioxide and lead sulfate as the counter electrode layer on the oxide dielectric film. On this counter electrode layer, a carbon layer and a silver paste layer were sequentially stacked and after placing a lead frame on the stacked body, the entirety was molded with epoxy resin to produce a chip capacitor.

Capacitor Production Method 3:

100 units of a niobium sintered body having on the surface thereof an oxide dielectric film formed by electrolytic oxidation at a voltage of 20 V for 6 hours in an aqueous 0.1% phosphoric acid solution were prepared. Thereafter, an operation of contacting the oxide dielectric film with an equivalent mixed solution of an aqueous 10% ammonium persulfate solution and an aqueous 0.5% anthraquinonesulfonic acid solution and then contacting it with a pyrrole vapor was repeated at least five times to form a counter electrode comprising polypyrrole. On this counter electrode, a carbon layer and a silver paste layer were sequentially stacked and after placing a lead frame on the stacked body, the entirety was molded with epoxy resin to produce a chip capacitor.

Capacitor Production Method 4:

100 units of a niobium sintered body having on the surface thereof an oxide dielectric film formed by electrolytic oxidation at a voltage of 20 V for 6 hours in an aqueous 0.1% phosphoric acid solution were prepared. Then, the niobium sintered body was dipped in an aqueous solution containing 25 mass % of ammonium persulfate (Solution 1), pulled up and dried at 80° C. for 30 minutes. Thereafter, the sintered body having formed thereon a dielectric material was dipped in an isopropanol solution containing 18 mass % of 3,4-ethylenedioxythiophene (Solution 2), pulled up and left standing in an atmosphere of 60° C. for 10 minutes, thereby performing the oxidation polymerization. The resulting sintered body was again dipped in Solution 1 and then treated in the same manner as above. After repeating the operation from the dipping in Solution 1 until the oxidation polymerization eight times, the sintered body was washed with hot water at 50° C. for 10 minutes and dried at 100° C. for 30 minutes, thereby forming a counter electrode comprising electrically conducting poly(3,4-ethylenedioxythiophene). On this counter electrode, a carbon layer and a silver paste layer were sequentially stacked and after placing a lead frame on the stacked body, the entirety was molded with epoxy resin to produce a chip capacitor.

EXAMPLE 1

Production of Niobium Powder

Niobium hydride powder (2,000 g) having an average particle size of 0.5 μm produced by the method of hydrogenating and then grinding a niobium ingot was prepared. This niobium hydride powder was added with stirring to 20 L of a mixed acid solution containing 0.5 mass % of hydrofluoric acid, 1.0 mass % of nitric acid and 1.0 mass % of hydrogen peroxide was added while keeping the solution temperature not exceeding 10° C. Stirring was further continued for 15 minutes while keeping the solution temperature not exceeding 10° C. The pH was adjusted to 7 by an aqueous potassium hydroxide solution and the powder was precipitated by a centrifugal separator. After removing the supernatant, an operation of suspending the powder by using 10 L of ion exchanged water, precipitating the powder by a centrifugal separator and removing the supernatant was repeated ten times. The resulting powder was dried at 50° C. under reduced pressure of $1\times10^2$ Pa to obtain niobium hydride powder having formed thereon etched pits.

In argon atmosphere, 300 g of silicon nitride powder having an average particle size of 20 nm was added to 1,000 g of the niobium hydride powder having formed thereon etched pits, mixed for ten minutes by a mixer and then irradiated with ultrasonic wave of 300 W having a frequency of 20 kHz for ten seconds. Furthermore, an operation of performing mixing for ten minutes and irradiating ultrasonic wave for ten seconds was repeated 20 times at room temperature.

Subsequently, 1,300 g of the obtained mixture of niobium hydride powder and silicon nitride powder was suspended in 10 L of ion exchanged water, the niobium hydride powder was precipitated by a centrifugal separator, and the supernatant containing excess silicon nitride powder was removed. This operation in series was repeated three times to obtain wet niobium hydride powder containing silicon nitride powder in etched pits.

The obtained wet powder was suspended in 2,000 ml of ion exchanged water and in the resulting solution, 100 g of niobium powder (oxygen content: about 13%) having an average particle size of 20 nm and niobium beads having an average particle size of 3 mm were added and mixed for ten hours by a shaking mixer. At this time, when the inner temperature exceeded 50° C., a method of stopping the shaking mixer and after thoroughly cooling the solution, restarting the shaking was employed. Thereafter, niobium beads were removed from the resulting suspension by using a standard sieve having a sieve opening of 1 mm, the powder was precipitated by a centrifugal separator, and then the supernatant was removed. The obtained wet powder was dried at 50° C. under reduced pressure of $1\times10^2$ Pa and then dehydrogenated at 450° C. under reduced pressure of $1\times10^2$ Pa or less to obtain niobium powder having a silicon nitride/niobium mixed layer in the vicinity of the powder particle surface.

The average particle size of the obtained niobium powder was 0.5 μm, the silicon nitride content was 240 mass ppm, and the thickness of the silicon nitride/niobium mixed layer was 54 nm.

EXAMPLE 2

Production of Niobium Powder

Niobium aggregated powder (2,000 g) having an average particle size of 4 μm resulting from aggregation of particles of about 0.5 μm was prepared by the method of reducing niobium oxide. This niobium powder was added with stirring to 20 L of an aqueous 20 mass % ammonia solution. Stirring was further continued for 50 hours and then the powder was precipitated by a centrifugal separator. After removing the supernatant, an operation of suspending the powder by using 10 L of ion exchanged water, precipitating the powder by a centrifugal separator and removing the supernatant was repeated ten times. The resulting powder was dried at 50° C. under reduced pressure of $1\times10^2$ Pa to obtain niobium powder having formed thereon etched pits.

In argon atmosphere, 200 g of silicon nitride powder having an average particle size of 10 nm was added to 1,000 g of the niobium powder having formed thereon etched pits, mixed for ten minutes by a mixer and then irradiated with ultrasonic wave of 300 W having a frequency of 20 kHz for ten seconds. Furthermore, an operation of performing mixing for ten minutes and irradiating ultrasonic wave for ten seconds was repeated 20 times at room temperature.

Subsequently, 1,200 g of the obtained mixture of niobium powder and silicon nitride powder was suspended in 10 L of ion exchanged water, the niobium powder was precipitate by a centrifugal separator, and the supernatant containing excess silicon nitride powder was removed. This operation in series was repeated three times to obtain wet niobium powder containing silicon nitride powder in etched pits.

The obtained wet powder was suspended in 2,000 ml of ion exchanged water and in the resulting solution, niobium beads having an average particle size of 5 mm were added and mixed for ten hours by a shaking mixer. At this time, when the inner temperature exceeded 50° C., a method of stopping the shaking mixer and after thoroughly cooling the solution, restarting the shaking was employed. Thereafter, niobium beads were removed from the resulting suspension by using a standard sieve having a sieve opening of 1 mm, the powder was precipitated by a centrifugal separator, and then the supernatant was removed. The obtained wet powder was dried at 50° C. under reduced pressure of $1\times10^2$ Pa to obtain niobium powder having a silicon nitride/niobium mixed layer in the vicinity of the powder particle surface.

The average particle size of the obtained niobium powder was 1 μm, the silicon nitride content was 130 mass ppm, and the thickness of the silicon nitride/niobium mixed layer was 25 nm.

EXAMPLES 3 TO 13

Production of Niobium Powder

Niobium powders having a silicon nitride/niobium mixed layer in the vicinity of the powder particle surface were obtained in Examples 3, 5, 7 and 9 in the same manner as in Example 1 except that an aqueous mixed acid solution containing from 0.2 to 1.5 mass % of hydrofluoric acid, 0.4 to 3.0 mass % of nitric acid and from 0.4 to 3.0 mass % of hydrogen peroxide was used as the etching solution and the etching was performed at −30° C. to 10° C.; in Examples 4, 6 and 8 in the same manner as in Example 1 except that a 10 to 20% trifluoroacetic acid solution prepared by dissolving trifluoroacetic acid in a water-ethanol solution was used as the etching solution and the etching was performed at from 0 to 40° C.; and in Examples 10 to 13 in the same manner as in Example 2 except that a 15 to 20 mass % ammonia solution prepared by dissolving ammonia in a water-ethanol solution was used as the etching solution, the etching was performed at 20 to 60° C., and silicon nitride having an average particle size of 10 to 50 nm was used. The physical properties of each niobium powder obtained are shown in Table 1.

TABLE 1

| Examples | Niobium Species | Average Particle Size, μm | Silicon Nitride Content, ppm | Thickness of Mixed Layer, nm | Specific Surface Area, m²/g |
|---|---|---|---|---|---|
| Example 1 | niobium | 0.5 | 240 | 54 | 8.6 |
| Example 2 | niobium | 1.0 | 130 | 25 | 2.3 |
| Example 3 | niobium | 0.3 | 100 | 10 | 20 |
| Example 4 | niobium | 0.3 | 1200 | 59 | 21 |
| Example 5 | niobium | 0.5 | 1600 | 100 | 9.3 |
| Example 6 | niobium | 0.5 | 4800 | 120 | 8.9 |
| Example 7 | niobium | 0.5 | 12400 | 130 | 8.7 |
| Example 8 | niobium | 0.5 | 21800 | 130 | 9.1 |
| Example 9 | niobium | 0.5 | 65200 | 140 | 9.7 |
| Example 10 | niobium | 0.8 | 960 | 150 | 3.5 |
| Example 11 | niobium | 0.8 | 7300 | 210 | 3.1 |
| Example 12 | niobium | 1.3 | 78000 | 350 | 1.2 |
| Example 13 | niobium | 1.6 | 131000 | 450 | 0.8 |

EXAMPLE 14

Production of Niobium Powder

The niobium powder obtained in Example 1 was heated at 360° C. for two hours in nitrogen atmosphere to effect a nitridation reaction. The nitrided amount of the powder obtained was 4,000 ppm. The physical properties of this powder are shown in Table 2.

EXAMPLES 15 TO 20

Production of Niobium Powder

By using the niobium species shown in Table 2, niobium powders having a silicon nitride/niobium mixed layer in the vicinity of the powder particle surface were obtained in Examples 15 and 16 in the same manner as in Example 1 except that an aqueous mixed acid solution containing from 0.2 to 1.5 mass % of hydrofluoric acid, from 0.4 to 3.0 mass % of nitric acid and from 0.4 to 3.0 mass % of hydrogen peroxide was used as the etching solution and the etching was performed at from −30° C. to 10° C.; in Examples 17 and 18 in the same manner as in Example 1 except that a 10 to 20% trifluoroacetic acid solution prepared by dissolving trifluoroacetic acid in a water-ethanol solution was used as the etching solution and the etching was performed at from 0 to 40° C.; and in Examples 19 and 20 in the same manner as in Example 2 except that a 15 to 20 mass % ammonia solution prepared by dissolving ammonia in a water-ethanol solution was used as the etching solution, the etching was performed at 20 to 60° C., and silicon nitride having an average particle size of 10 to 50 nm was used. The physical properties of each niobium powder obtained are shown in Table 2.

particle size of 5 mm were further added. These were mixed for one hour by a shaking mixer and after removing the niobium beads, the resulting mixture was spread in a niobium-made vat and dried under the conditions of $1\times10^2$ Pa and 50° C. Subsequently, this mixture was sintered at 1,150° C. for 12 hours under reduced pressure of $4\times10^{-3}$ Pa. The sintering product was cooled to 30° C. or lower and then, argon containing 0.1% of oxygen was gradually added while keeping the product temperature not exceeding 30° C., to form a thin oxide film on the niobium powder surface. The resulting sintered barium oxide-mixed niobium lump was cracked by a roll granulator to obtain cracked barium oxide-mixed niobium powder having an average particle size of 105 μm.

Thereafter, 500 g of this cracked barium oxide-mixed niobium powder and 1,000 g of ion exchanged water were charged into a Teflon (registered trademark)-made vessel and cooled to 15° C. or lower. Separately, an aqueous solution obtained by mixing 600 g of 60% nitric acid, 150 g of 30% hydrogen peroxide and 750 g of ion exchanged water and cooled to 15° C. or lower was prepared. 500 g of this aqueous solution was added dropwise to an aqueous solution having suspended therein the cracked barium oxide-mixed niobium powder while stirring and keeping the solution temperature not exceeding 20° C. After the completion of dropwise addition, stirring was further continued for one hour and the resulting solution was left standing for 30 minutes and then

TABLE 2

| Examples | Niobium Species | Average Particle Size, μm | Silicon Nitride Content, ppm | Thickness of the Mixed Layer, nm | Specific Surface Area, $m^2/g$ |
|---|---|---|---|---|---|
| Example 14 | partially nitrided niobium (nitrogen content: 4000 ppm) | 0.5 | 240 | 55 | 9.4 |
| Example 15 | diniobium mononitride-containing niobium (molar ratio: Nb:Nb$_2$N = 99:1) | 0.5 | 170 | 34 | 9.9 |
| Example 16 | niobium-silicon alloy (atomic ratio: Nb:Si = 94:6) | 0.5 | 530 | 58 | 8.8 |
| Example 17 | niobium-rhenium-silicon alloy (atomic ratio: Nb:Re:Si = 92:0.5:7.5) | 0.5 | 820 | 64 | 9.6 |
| Example 18 | niobium-tantalum alloy (atomic ratio: Nb:Ta = 98:2) | 0.5 | 330 | 52 | 8.5 |
| Example 19 | niobium-zirconium alloy (atomic ratio: Nb:Zr = 98:2) | 0.5 | 1400 | 100 | 9.2 |
| Example 20 | niobium monoxide powder | 0.5 | 140 | 61 | 9.4 |

EXAMPLE 21

Production of Granulated Powder

In a niobium-made pot, 1,000 g of niobium powder having a silicon nitride/niobium mixed layer in the vicinity of the powder particle surface obtained in the same manner as in Example 1, 1,000 ml of toluene and as pore-forming materials, 150 g of barium oxide having an average particle size of 1 μm and 60 g of barium oxide having an average particle size of 3 μm were charged, and niobium beads having an average decanted. Thereto, 2,000 g of ion exchanged water was added and after stirring 30 minutes, the resulting solution was left standing for 30 minutes and then decanted. This operation was repeated five times and the cracked niobium powder was then packed in a Teflon (registered trademark)-made column and washed with water for 4 hours by running ion exchanged water. At this time, the electric conductivity of the washing water was 0.9 μS/cm.

After the completion of water washing, the cracked niobium powder was dried at 50° C. under reduced pressure to obtain granulated niobium powder having a silicon nitride/ niobium mixed layer in the vicinity of the surface. The average particle size of this granulated niobium powder was 125 μm, the silicon nitride content was 240 mass ppm, and the thickness of the silicon nitride/niobium mixed layer was 65 nm. The physical properties of this granulated niobium powder are shown in Table 3.

EXAMPLES 22 TO 28

Production of Granulated Powder

By using the niobium primary powder obtained in the same manner as in Example 4 (Example 22), Example 6 (Example 23), Example 8 (Example 24), Example 14 (Example 25), Example 16 (Example 26), Example 18 (Example 27) or Example 20 (Example 28), granulated niobium powders having a silicon nitride/niobium mixed layer in the vicinity of the surface were prepared in the same manner as in Example 21 except for using barium oxide, calcium oxide or magnesium oxide having an average particle size of 1 μm and/or 3 μm as the pore-forming material. The physical properties of each granulated niobium powder are shown in Table 3.

comprising a mixture of niobium, barium oxide and polyisobutyl methacrylate and having an average particle size of 120 μm.

This mixture granulated product was charged into a hopper of a tantalum device automatic shaping machine (TAP-2R, manufactured by Seiken Co., Ltd.) and automatically shaped together with a niobium wire of 0.3 mmφ to produce a shaped article having a size of about 3.3 mm×1.8 mm×4.3 mm (about 25 mm$^3$). The density of this shaped article was 2.8 g/ml in terms of niobium (niobium amount: 72 mg).

Thereafter, this shaped article was heated at 250 to 400° C. for three hours under $1×10^{-2}$ Pa to decompose and remove the polyisobutyl methacrylate, sintered by allowing it to stand at 1,150° C. for 60 minutes under reduced pressure of $4×10^{-3}$ Pa, and then cooled until the product temperature became 30° C. or lower. An operation of gradually adding nitrogen gas containing 0.1 vol % of oxygen while keeping the product temperature not exceeding 30° C. and then removing the gas under reduced pressure was repeated until the product temperature stopped changing. The resulting barium oxide-

TABLE 3

| Example No. | Primary Powder | Average Particle Size, μm | Silicon Nitride Content, ppm | Thickness of the Mixed Layer, nm | Bulk Density, g/ml | Tapping Density, g/ml | Angle of Repose | Number of Pore Diameter Peaks | Pore Diameter Peak, μm | Specific Surface Area, m²/g |
|---|---|---|---|---|---|---|---|---|---|---|
| Example 21 | Example 1 | 125 | 240 | 65 | 0.9 | 1.1 | 45 | 2 | 0.7, 2.9 | 4.2 |
| Example 22 | Example 4 | 90 | 1200 | 72 | 0.8 | 1.0 | 49 | 2 | 0.6, 2.8 | 11 |
| Example 23 | Example 6 | 105 | 4800 | 149 | 0.9 | 1.1 | 41 | 2 | 0.8, 3.0 | 4.4 |
| Example 24 | Example 8 | 150 | 21800 | 153 | 0.8 | 1.0 | 46 | 2 | 0.8, 2.7 | 4.7 |
| Example 25 | Example 14 | 75 | 240 | 63 | 1.0 | 1.2 | 39 | 2 | 0.8, 2.7 | 4.1 |
| Example 26 | Example 16 | 110 | 530 | 73 | 0.9 | 1.1 | 41 | 2 | 0.7, 2.9 | 4.2 |
| Example 27 | Example 18 | 210 | 330 | 61 | 0.8 | 1.0 | 40 | 2 | 0.6, 2.8 | 4.4 |
| Example 28 | Example 20 | 95 | 140 | 72 | 0.8 | 1.0 | 39 | 2 | 0.7, 2.8 | 4.8 |

EXAMPLE 29

Production of Sintered Body

At room temperature, 50 g of camphor was dissolved in 1,000 ml of toluene. In the resulting solution, 840 g of niobium powder having a silicon nitride/niobium mixed layer in the vicinity of the powder particle surface obtained in the same manner as in Example 5, 80 g of barium oxide powder having an average particle size of 0.7 μm, and 80 g of barium oxide having an average particle size of 2 μm were dispersed. The obtained dispersion was mixed for one hour in a Dynomill by using niobium beads of 2 mm. The resulting slurry was charged in a Nauter mixer and granulated while drying it under reduced pressure under the conditions of $1×10^2$ Pa and 80° C. to obtain a granulated product comprising a mixture of barium oxide, camphor and niobium and having an average particle size of 120 μm.

Camphor was removed from this mixture granulated product at 480° C. under reduced pressure of $1×10^2$ Pa or less to obtain 1,000 g of a hard niobium/barium oxide mixture granulated product having an average particle size of 120 μm. The obtained hard niobium/barium oxide mixture granulated product was dispersed in a solution prepared by dissolving 30 g of polyisobutyl methacrylate in 500 ml of toluene and reduced-pressure dried under the conditions of $1×10^2$ Pa and 80° C. by using a conical drier to obtain a granulated product mixed niobium sintered body was left standing for 8 hours or more and then taken out.

1,000 units of the thus-obtained barium oxide-mixed niobium sintered body and 1,000 g of ion exchanged water were placed in a Teflon (registered trademark)-made vessel and cooled to 15° C. or lower. Separately, an aqueous solution obtained by mixing 600 g of 60% nitric acid, 150 g of 30% hydrogen peroxide and 750 g of ion exchanged water and cooled to 15° C. or lower was prepared. 500 g of this aqueous solution was added dropwise to the vessel containing the barium oxide-mixed niobium sintered body and ion exchanged water to dissolve the barium oxide while stirring and keeping the solution temperature not exceeding 20° C. After the completion of dropwise addition, stirring was further continued for two hours and then the content was left standing for 30 minutes and then decanted. Furthermore, 2,000 g of ion exchanged water was added and after stirring for 30 minutes, the content was left standing for 30 minutes and then decanted. This operation was repeated five times and then, the niobium sintered body was packed in a Teflon (registered trademark)-made column and washed for four hours by running ion exchanged water to remove the barium oxide as a barium salt. At this time, the electric conductivity of the washing water was 0.9 μS/cm.

The resulting niobium sintered body was reduced-pressure dried under the conditions of $1×10^2$ Pa and 50° C. and then cooled until the product temperature became 30° C. or lower. Subsequently, an operation of gradually adding nitrogen gas containing 0.1 vol % of oxygen while keeping the product temperature not exceeding 30° C. and then removing the gas under reduced pressure was repeated until the product temperature stopped changing, and then the sintered body was left standing for 8 hours or more to obtain a niobium anode sintered body implanted with a niobium lead wire and having a silicon nitride/niobium mixed layer in the vicinity of the surface. The volume of this anode sintered body was about 22 mm$^3$, the density of the sintered body was 3.2 g/ml, the specific surface area was 0.0077 m$^2$/mm$^3$ and the porosity was 63%. Also, the sintered body had pore diameter distribution peak tops at 0.7 μm and 2 μm and the total volume of pores having a diameter of 1 μm or more was 17 vol % of the entire pore volume. The silicon nitride content was 1,600 mass ppm, and the thickness of the silicon nitride/niobium mixed layer was 118 nm.

EXAMPLES 30 TO 32

Production of Sintered Body

Niobium powders having a silicon nitride/niobium mixed layer in the vicinity of the powder particle surface were obtained in Example 30 in the same manner as in Example 15; in Example 31 in the same manner as in Example 17; and in Example 32 in the same manner as in Example 19. By using the niobium powder, a niobium anode sintered body implanted with a niobium lead wire and having a silicon nitride/niobium mixed layer in the vicinity of the surface was obtained in the same manner as in Example 29. The physical properties of each sintered body obtained are shown in Table 4.

EXAMPLE 33

Production of Sintered Body

Niobium granulated powder having a silicon nitride/niobium mixed layer in the vicinity of the surface was obtained in the same manner as in Example 21. This niobium granulated powder was dispersed in a solution obtained by dissolving 30 g of polyisobutyl methacrylate in 500 ml of toluene and then reduced-pressure dried under the conditions of 1×10$^2$ Pa and 80° C. to obtain a niobium/polyisobutyl methacrylate mixture granulated product having an average particle size of 125 μm. This mixture granulated product was charged into a hopper of a tantalum device automatic shaping machine (TAP-2R, manufactured by Seiken Co., Ltd.) and automatically shaped together with a niobium wire of 0.3 mmφ to produce a shaped article having a size of about 3.3 mm×1.8 mm×4.3 mm (about 25 mm$^3$). The density of this shaped article was 2.8 g/ml in terms of niobium (niobium amount: 72 mg).

Thereafter, this shaped article was heated at 250 to 400° C. for three hours under 1×10$^{-2}$ Pa to decompose and remove the polyisobutyl methacrylate, sintered by allowing it to stand at 1,250° C. for 30 minutes under reduced pressure of 4×10$^{-3}$ Pa, and then cooled until the product temperature became 30° C. or lower. An operation of gradually adding nitrogen gas containing 0.1 vol % of oxygen while keeping the product temperature not exceeding 30° C. and then removing the gas under reduced pressure was repeated until the product temperature stopped changing. The resulting product was left standing for 8 hours or more to obtain a niobium anode sintered body having a silicon nitride/niobium mixed layer in the vicinity of the surface.

The volume of this anode sintered body was about 22 mm$^3$, the density of the sintered body was 3.2 g/ml, the specific surface area was 0.0059 m$^2$/mm$^3$ and the porosity was 63%. Also, the sintered body had pore diameter peak tops at 0.7 μm and 2.3 μm and the volume of pores having a diameter of 1 μm or more was 12 vol % of the entire pore volume. The silicon nitride content was 240 mass ppm, and the thickness of the silicon nitride/niobium mixed layer was 65 nm.

EXAMPLES 34 TO 40

Production of Sintered Body

Niobium powders having a silicon nitride/niobium mixed layer in the vicinity of the surface were obtained in Example 34 in the same manner as in Example 22; in Example 35 in the same manner as in Example 23; in Example 36 in the same manner as in Example 24; in Example 37 in the same manner as in Example 25; in Example 38 in the same manner as in Example 26; in Example 39 in the same manner as in Example 27; and in Example 40 in the same manner as in Example 28. By using the niobium powder, a niobium anode sintered body implanted with a niobium lead wire and having a silicon nitride/niobium mixed layer in the vicinity of the surface was produced in the same manner as in Example 33. The physical properties of each sintered body obtained are shown in Table 4.

EXAMPLES 41 TO 43

Production of Sintered Body

By performing the automatic shaping together with a 0.3 mmφ niobium wire in the same manner as in Example 29, a shaped article having a size of about 2.6 mm×1.4 mm×3.4 mm (about 12 mm$^3$) was obtained in Example 41, a shaped article having a size of about 4.3 mm×2.3 mm×5.6 mm (about 55 mm$^3$) in Example 42, and a shaped article having a size of about 5.5 mm×3.0 mm×7.2 mm (about 119 mm$^3$) in Example 43. Each shaped article was sintered to obtain a sintered body. The volume of the sintered body was about 11 mm$^3$ in Example 41, about 48 mm$^3$ in Example 42, and about 105 mm$^3$ in Example 43. The physical properties of each sintered body are shown in Table 4.

TABLE 4

| Example No. | Primary Powder | Volume of the Sintered Body, mm$^3$ | Silicon Nitride Content, ppm | Thickness of the Mixed Layer, nm | Specific Surface Area, m$^2$/mm$^3$ | Porosity, % | Number of Pore Diameter Peaks | Pore Diameter Peak, μm | Volume of Pores of 1 μm or more, % |
|---|---|---|---|---|---|---|---|---|---|
| Example 29 | Example 5 | 22 | 1600 | 118 | 0.0077 | 63 | 2 | 0.7, 2.0 | 17 |
| Example 30 | Example 15 | 22 | 170 | 40 | 0.0076 | 61 | 2 | 0.6, 2.1 | 16 |
| Example 31 | Example 17 | 22 | 820 | 75 | 0.0079 | 62 | 2 | 0.6, 1.9 | 16 |
| Example 32 | Example 19 | 22 | 1390 | 119 | 0.0080 | 63 | 2 | 0.7, 2.1 | 17 |

TABLE 4-continued

| Example No. | Primary Powder | Volume of the Sintered Body, mm³ | Silicon Nitride Content, ppm | Thickness of the Mixed Layer, nm | Specific Surface Area, m²/mm³ | Porosity, % | Number of Pore Diameter Peaks | Pore Diameter Peak, μm | Volume of Pores of 1 μm or more, % |
|---|---|---|---|---|---|---|---|---|---|
| Example 33 | Example 21 | 22 | 240 | 65 | 0.0059 | 63 | 2 | 0.7, 2.3 | 14 |
| Example 34 | Example 22 | 22 | 1200 | 71 | 0.0144 | 62 | 2 | 0.6, 2.3 | 13 |
| Example 35 | Example 23 | 22 | 4700 | 151 | 0.0058 | 62 | 2 | 0.8, 2.4 | 13 |
| Example 36 | Example 24 | 22 | 21700 | 155 | 0.0059 | 62 | 2 | 0.7, 2.4 | 14 |
| Example 37 | Example 25 | 22 | 240 | 63 | 0.0055 | 61 | 2 | 0.7, 2.3 | 13 |
| Example 38 | Example 26 | 22 | 530 | 76 | 0.0055 | 61 | 2 | 0.7, 2.4 | 13 |
| Example 39 | Example 27 | 22 | 330 | 63 | 0.0057 | 62 | 2 | 0.6, 2.3 | 13 |
| Example 40 | Example 28 | 22 | 140 | 70 | 0.0059 | 62 | 2 | 0.7, 2.4 | 14 |
| Example 41 | Example 1 | 11 | 240 | 62 | 0.0076 | 63 | 2 | 0.7, 2.0 | 17 |
| Example 42 | Example 1 | 48 | 250 | 65 | 0.0077 | 62 | 2 | 0.7, 1.9 | 16 |
| Example 43 | Example 1 | 105 | 240 | 62 | 0.0077 | 62 | 2 | 0.7, 2.0 | 16 |

EXAMPLES 44 TO 58

Production of Capacitor

Sintered bodies were produced in the same manner as in Examples 29 to 43, respectively, and 100 units were prepared for each sintered body. Each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by any one of Capacitor Production Methods 1 to 4 and after stacking a carbon paste and a silver paste in this order, the entirety was molded with epoxy resin to produce a chip capacitor. The capacitance, breakdown voltage and soldering heat resistance of the produced capacitor are shown in Table 5.

COMPARATIVE EXAMPLE 1

Capacitor Using Niobium Powder Obtained from Potassium Fluoroniobate

In a nickel-made crucible, 5,000 g of potassium fluoroniobate thoroughly vacuum-dried at 80° C. and sodium in an amount of 10 times by mol the potassium fluoroniobate were charged and allowed to perform a reduction reaction at 1,000° C. for 20 hours in argon atmosphere. After the completion of the reaction, the reduction product was cooled, washed with water, then washed sequentially with 95% sulfuric acid and with water, vacuum-dried and ground for 40 hours by using a ball mill of a niobium-made pot containing niobium balls. The ground product was dipped and stirred in a 3:2 (by mass) mixed solution of 50% nitric acid and 10% aqueous hydrogen peroxide. Thereafter, the ground product was thoroughly washed with water until the pH reached 7 to remove impurities, and then vacuum-dried. The average particle size of the obtained niobium powder was 0.5 μm.

This niobium powder was formed into granulated powder having an average particle size of 100 μm in the same manner as in Example 21 and then, a niobium sintered body not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with epoxy resin to produce a chip capacitor. The capacitance, breakdown voltage and soldering heat resistance of the produced capacitor are shown in Table 5.

COMPARATIVE EXAMPLE 2

Capacitor Using Partially Nitrided Niobium Powder

A niobium ingot (1,000 g) was placed in an SUS304-made reaction vessel and hydrogen was continuously introduced thereinto at 400° C. for ten hours. The hydrogenated niobium lump was cooled and then ground for 10 hours in a niobium-made pot containing niobium balls. This hydride was formed into a 20 vol % slurry with water, charged together with niobium balls in a spike mill, and wet-ground at 40° C. or lower for ten hours to form a ground slurry of niobium hydride. After centrifugal separation, the supernatant was removed and wet niobium hydride powder was obtained. This wet powder was reduced-pressure dried under the conditions of 133 Pa and 50° C., heated for 4 hours under the conditions of $1\times10^{-2}$ Pa and 400° C., thereby dehydrogenating and converting the niobium hydride into niobium, cooled to room temperature and then subjected to a nitridation treatment at 300° C. for 3 hours by passing nitrogen under applied pressure to obtain about 1,000 g of partially nitrided niobium powder. The average particle size of the niobium hydride powder was 0.5 μm and the nitrogen content was 0.38 mass %.

The powder obtained was formed into granulated powder having an average particle size of 110 μm in the same manner as in Example 21 and then, a niobium sintered body not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with epoxy resin to produce a chip capacitor. The capacitance, breakdown voltage and soldering heat resistance of the produced capacitor are shown in Table 5.

COMPARATIVE EXAMPLE 3

Capacitor Using Partially Nitrided Niobium-Silicon Alloy

A niobium-silicon alloy (atomic ratio: Nb:Si=94:6) ingot (1,000 g) was placed in an SUS304-made reaction vessel and hydrogen was continuously introduced thereinto at 400° C. for 10 hours. The hydrogenated niobium alloy lump was cooled and then ground for 10 hours in a niobium-made pot containing niobium balls. This hydride was formed into a 20 vol % slurry with water, charged together with niobium balls in a spike mill, and wet-ground at 40° C. or lower for 10 hours to form a ground slurry of niobium hydride-silicon alloy. After centrifugal separation, the supernatant was removed and wet niobium hydride-silicon alloy powder was obtained. This wet powder was reduced-pressure dried under the conditions of 133 Pa and 50° C., heated for 4 hours under the conditions of $1\times10^{-2}$ Pa and 400° C., thereby dehydrogenating and converting the niobium hydride-silicon alloy into niobium-silicon alloy, cooled to room temperature and then subjected to a nitridation treatment at 300° C. for 3 hours by passing nitrogen under applied pressure to obtain about 1,000 g of a partially nitrided niobium-silicon alloy powder. The average particle size of the raw material niobium hydride-silicon alloy powder was 0.5 μm and the nitrogen content was 0.35 mass %.

The powder obtained was formed into granulated powder having an average particle size of 95 μm in the same manner as in Example 21 and then, a niobium-silicon alloy sintered body not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with an epoxy resin to produce a chip capacitor. The capacitance, breakdown voltage and soldering heat resistance of the produced capacitor are shown in Table 5.

COMPARATIVE EXAMPLE 4

Capacitor Using Niobium Monoxide Powder Obtained by Reduction

Flaked niobium powder (211 g) and $Nb_2O_5$ powder (119 g) were mixed and put on a tantalum-made tray. This tray was disposed in a reduced-pressure heat treatment furnace and heated at 1,000° C. After the pressure was adjusted to $2\times10^4$ Pa by introducing hydrogen gas and the temperature was adjusted to 1,250° C., this state was maintained for 30 minutes. Thereafter, the hydrogen gas was entirely removed from the furnace, and argon gas was introduced into the furnace. Then, while the temperature was lowered to and kept at 1,050° C., the argon gas was extracted from the furnace until the pressure became $5\times10^{-2}$ Pa. At the same temperature, argon gas was introduced into the furnace until the pressure became $9.3\times10^4$ Pa, and the furnace was cooled to 60° C. Furthermore, argon gas was introduced until the pressure became $9.3\times10^4$ Pa, and air was filled until the pressure became 101 kPa. After four minutes, the pressure was reduced to 1.3 Pa. Thereafter, argon gas was refilled until the pressure became $8.0\times10^4$ Pa and air was subsequently refilled until the pressure became 101 kPa. After keeping this state for four minutes, the pressure in the vessel was reduced to 1.3 Pa. Then, argon gas was refilled until the pressure became $5.3\times10^{-4}$ Pa and air was subsequently refilled until the pressure became 101 kPa. After four minutes, the pressure in the vessel was reduced to 1.3 Pa. Thereafter, argon gas was refilled until the pressure became $2.7\times10^4$ Pa and air was subsequently refilled until the pressure became 101 kPa. After keeping this state for four minutes, the pressure in the vessel was reduced to 1.3 Pa. Then, air was refilled until the pressure became 101 kPa and this state was maintained for four minutes. After reducing the pressure in the vessel to 1.3 Pa, the vessel was refilled with argon gas until the pressure became 101 kPa and then opened, and the sample was taken out. The sample was passed through a 40-mesh sieve to obtain niobium powder containing Nb and NbO.

By using this niobium powder, a niobium sintered body not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with epoxy resin to produce a chip capacitor. The capacitance, breakdown voltage and soldering heat resistance of the produced capacitor are shown in Table 5.

COMPARATIVE EXAMPLE 5

Capacitor Using Niobium Powder Coated with $SiO_2$

A niobium ingot (1,000 g) was placed in an SUS304-made reaction vessel and hydrogen was continuously introduced thereinto at 400° C. for 10 hours. The hydrogenated niobium lump was cooled and then ground for 10 hours in a niobium-made pot containing niobium balls. This hydride was formed into a 20 vol % slurry with water, charged together with niobium balls in a spike mill, and after adding 10 g of amorphous $SiO_2$ having an average particle size of 20 nm, wet-ground at 40° C. or lower for 10 hours to obtain a ground slurry of niobium hydride. After centrifugal separation, the supernatant was removed and a wet niobium hydride powder was obtained. This wet powder was reduced-pressure dried under the conditions of 133 Pa and 50° C., heated for four hours under the conditions of $1\times10^{-2}$ Pa and 400° C., thereby dehydrogenating and converting the niobium hydride powder into niobium powder, and then cooled to obtain about 1,000 g of niobium powder surface-coated with $SiO_2$. The average particle size of this niobium powder was 0.5 μm and the $SiO_2$ content was 0.5 mass %.

This niobium powder was formed into granulated powder having an average particle size of 80 μm in the same manner as in Example 21 and then, a niobium sintered body surface-coated With $SiO_2$ and not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with epoxy resin to produce a chip capacitor. The capacitance, breakdown voltage and soldering heat resistance of the produced capacitor are shown in Table 5.

COMPARATIVE EXAMPLE 6

Capacitor Using Silica-Coated Niobium Powder

Niobium powder surface-coated with $SiO_2$ having an average particle size of 0.5 μm and an $SiO_2$ content of 1.5 mass % was obtained in the same manner as in Comparative Example 5.

This niobium powder (1,000 g) was thoroughly mixed with metal magnesium shavings (75 g) and then put on a niobium tray. This tray was disposed in a reduced-pressure heat treatment furnace and the inside of the furnace was displaced with argon gas. Then, the argon gas in the furnace was extracted to adjust the pressure to $8 \times 10^4$ Pa, and the temperature inside the furnace was elevated to 450° C. at 8° C./min. While keeping the pressure in the system at about $1 \times 10^5$ Pa, the temperature in the furnace was elevated from 450° C. to 650° C. at 4° C./min, and this temperature was maintained for two hours. After cooling to room temperature, argon gas was introduced until the pressure became $9.3 \times 10^4$ Pa, and air was filled until the pressure became 101 kPa. After four minutes, the pressure was reduced to 1.3 Pa. Thereafter, argon gas was refilled until the pressure became $8.0 \times 10^4$ Pa and air was subsequently refilled until the pressure became 101 kPa. After keeping this state for four minutes, the pressure in the vessel was reduced to 1.3 Pa. Then, argon gas was refilled until the pressure became $5.3 \times 10^{-4}$ Pa and air was subsequently refilled until the pressure became 101 kPa. After four minutes, the pressure in the vessel was reduced to 1.3 Pa. Thereafter, argon gas was refilled until the pressure became $2.7 \times 10^4$ Pa and air was subsequently refilled until the pressure became 101 kPa. After keeping this state for four minutes, the pressure in the vessel was reduced to 1.3 Pa. Then, air was refilled until the pressure became 101 kPa and this state was maintained for four minutes. After reducing the pressure in the vessel to 1.3 Pa, the vessel was refilled with argon gas until the pressure became 101 kPa and then opened, and niobium powder surface-coated with metal Si was obtained. The average particle size of this niobium powder was 0.5 μm and the Si content was 0.8 mass %.

This powder was formed into granulated powder having an average particle size of 125 μm in the same manner as in Example 21 and then, a niobium sintered body surface-coated with metal Si and not having a silicon nitride/niobium mixed layer was obtained in the same manner as in Example 33.

100 units of this sintered body were prepared and each sintered body was electrochemically formed in an aqueous 0.1% phosphoric acid solution under the conditions of 80° C., 600 minutes and 20 V to form an oxide dielectric film layer on the surface of the sintered body. The electrochemically formed sintered body was then impregnated with a cathode agent by Capacitor Production Method 4 and after stacking a carbon paste and a silver paste in this order, the entirety was molded with epoxy resin to produce a chip capacitor. The capacitance, breakdown voltage and soldering heat resistance of the produced capacitor are shown in Table 5.

TABLE 5

| Examples | Sintered Body | Capacitor Production Method | Average Capacitance, μF/unit | ESR, mΩ/unit | Breakdown Voltage, V | Soldering Heat Resistance, units/units |
|---|---|---|---|---|---|---|
| Example 44 | Example 29 | 3 | 762 | 26 | 7 | 100/100 |
| Example 45 | Example 30 | 1 | 757 | 19 | 7 | 100/100 |
| Example 46 | Example 31 | 2 | 771 | 20 | 7 | 100/100 |
| Example 47 | Example 32 | 4 | 774 | 19 | 6 | 100/100 |
| Example 48 | Example 33 | 4 | 580 | 29 | 7 | 100/100 |
| Example 49 | Example 34 | 3 | 1130 | 17 | 6 | 100/100 |
| Example 50 | Example 35 | 4 | 572 | 31 | 8 | 100/100 |
| Example 51 | Example 36 | 3 | 579 | 29 | 7 | 100/100 |
| Example 52 | Example 37 | 4 | 552 | 31 | 7 | 100/100 |
| Example 53 | Example 38 | 3 | 561 | 33 | 7 | 100/100 |
| Example 54 | Example 39 | 4 | 577 | 32 | 8 | 100/100 |
| Example 55 | Example 40 | 3 | 584 | 29 | 7 | 100/100 |
| Example 56 | Example 41 | 4 | 350 | 35 | 8 | 100/100 |
| Example 57 | Example 42 | 3 | 1680 | 15 | 7 | 100/100 |
| Example 58 | Example 43 | 4 | 3675 | 10 | 7 | 100/100 |
| Comparative Example 1 | — | 4 | 490 | 35 | 4 | 0/100 |
| Comparative Example 2 | — | 4 | 568 | 33 | 4 | 23/100 |
| Comparative Example 3 | — | 4 | 581 | 31 | 4 | 31/100 |
| Comparative Example 4 | — | 4 | 553 | 30 | 4 | 17/100 |
| Comparative Example 5 | — | 4 | 573 | 32 | 4 | 33/100 |
| Comparative Example 6 | — | 4 | 510 | 33 | 4 | 14/100 |

Figure 5:
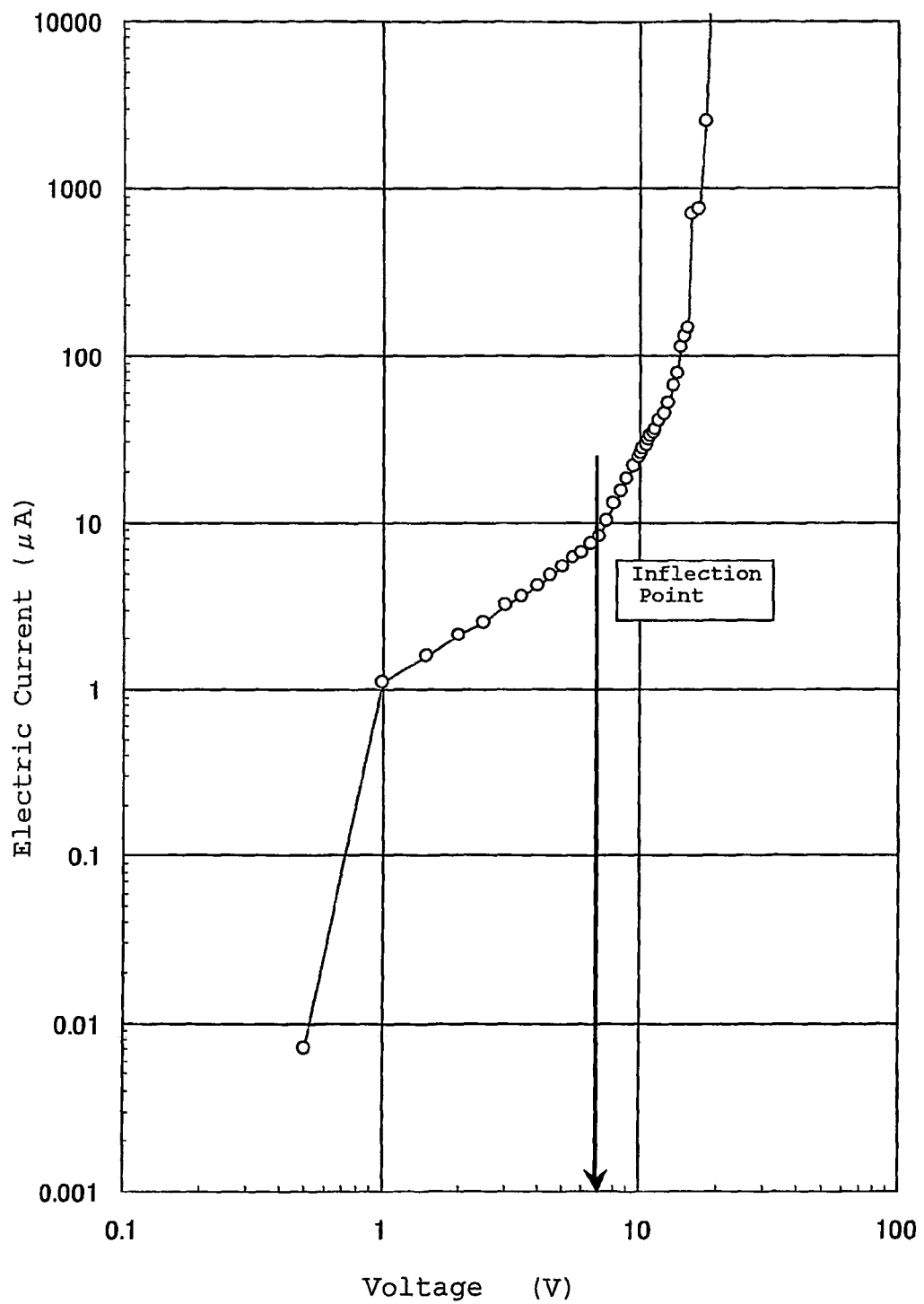
FIG. 5 is a graph showing the breakdown voltage of the capacitor using the sintered body of Example 33.
Figure 6:
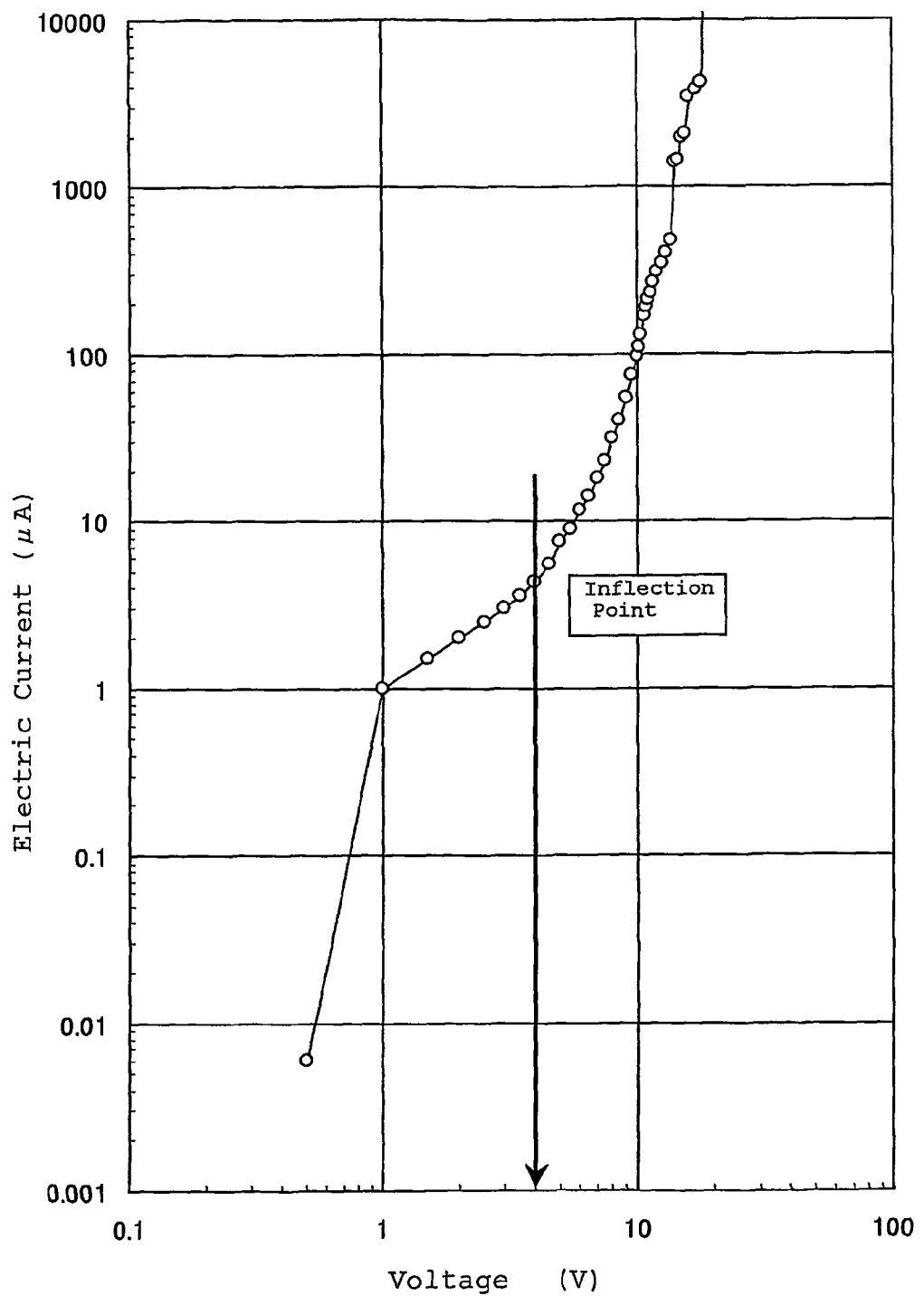
FIG. 6 is a graph showing the breakdown voltage of the capacitor using the sintered body of Comparative Example 6.

FIGS. 5 and 6 are the graphs configured for the evaluation of breakdown voltage of the capacitor produced by Capacitor Production Method 4 by using the sintered body of Example 33 and the capacitor obtained in Comparative Example 6, respectively. It is seen that the first inflection point of the leakage current of the capacitor produced by using the sintered body of Example 33 is present in the vicinity of 7 V and that of the capacitor of Comparative Example 6 is present in the vicinity of 4 V. As this value is closer to the electrochemical forming voltage (20 V in these Example and Comparative Example), the breakdown voltage can be said to be better.

INDUSTRIAL APPLICABILITY

The capacitor of the present invention is a capacitor having high capacitance, low ESR, excellent breakdown voltage and soldering heat resistance, small leakage current value and good long-term reliability. Particularly, when an organic semiconductor is used as the material for the other electrode, the effect of enhancing the breakdown voltage and soldering heat resistance is profound.

The capacitor of the present invention having these properties can be applied to uses such as a bypass or coupling capacitor often used in an analog or digital circuit, and uses of a conventional tantalum capacitor.

In general, such a capacitor is much used in an electronic circuit and therefore, when the capacitor of the present invention having high capacitance, low ESR and good breakdown voltage and soldering heat resistance is used, an integrated circuit particularly having a high clock number is relieved from restriction in arrangement of electronic parts or in discharge of heat, and a highly reliable electronic circuit can be packaged in a smaller space than ever before.

Furthermore, when the capacitor of the present invention is used, a highly reliable electronic device more compact than ever before, such as a computer, computer peripheral device (e.g., a PC card), mobile device (e.g., a cellular phone), home appliance, in-vehicle device, artificial satellite and communication device, can be obtained.

The invention claimed is:

1. A niobium powder for a capacitor comprising niobium primary particles, said particles having a center part and a surface, said particles comprising niobium not containing silicon nitride present at least in the center part and a mixed layer of silicon nitride and niobium, the mixed layer being present in the vicinity of the powder particle surface,
wherein the thickness of the mixed layer is from 8 to 2,000 nm.

2. The niobium powder for a capacitor as claimed in claim 1, wherein the silicon nitride content is from 50 to 500,000 mass ppm.

3. The niobium powder for a capacitor as claimed in claim 1, wherein the silicon nitride is a compound represented by $Si_\alpha N_\beta$, wherein $\alpha$ and $\beta$ each represents a positive integer.

4. The niobium powder for a capacitor as claimed in claim 3, wherein the silicon nitride is at least one member selected from SiN, $Si_2N_2$, $Si_2N_3$ and $Si_3N_4$.

5. The niobium powder for a capacitor as claimed in claim 1, wherein the niobium in the niobium layer and the mixed layer is at least one member selected from pure niobium, a niobium compound, a niobium alloy and a hydride thereof.

6. The niobium powder for a capacitor as claimed in claim 5, wherein the niobium compound is at least one member selected from niobium hydride, niobium nitride and niobium oxide.

7. The niobium powder for a capacitor as claimed in claim 1, wherein the average particle size is from 0.05 to 5 μm.

8. The niobium powder for a capacitor as claimed in claim 1, wherein the specific surface area is from 0.5 to 70 m²/g.

9. A method for producing a niobium powder for a capacitor comprising niobium primary particles, said particles having a center part and a surface, said particles comprising niobium not containing silicon nitride present at least in the center part and a mixed layer of silicon nitride and niobium, the mixed layer being present in the vicinity of the powder particle surface and wherein the thickness of the mixed layer is from 8 to 2,000 nm, said method comprising a step of etching a niobium powder, a step of impregnating the etched pores with silicon nitride, and a step of closing the etched pores.

10. The production method of a niobium powder for a capacitor as claimed in claim 9, wherein the niobium powder is a primary powder having an average particle size of 0.05 to 5 μm, or an aggregated or granulated powder thereof.

11. The production method of a niobium powder for a capacitor as claimed in claim 9, which comprises a step of doping at least one element selected from the group consisting of nitrogen, oxygen, phosphorus, sulfur, selenium and tellurium, after the etching step but before the impregnation step, after the impregnation step but before the closing step, or after the closing step.

12. The production method of a niobium powder for a capacitor as claimed in claim 9, wherein the step of closing etched pores is performed in the presence of niobium, a niobium compound, niobium alloy or hydride thereof having an average particle size of 1 to 200 nm.

13. The production method of a niobium powder for a capacitor as claimed in claim 9, wherein the niobium powder is at least one member selected from niobium, a niobium compound, a niobium alloy and a hydride thereof.

14. The production method of a niobium powder for a capacitor as claimed in claim 13, wherein the niobium compound is a niobium compound containing nitrogen and/or oxygen.

15. The production method of a niobium powder for a capacitor as claimed in claim 9, wherein the etching agent for use in the etching step is an acid or an alkali.

16. The production method of a niobium powder for a capacitor as claimed in claim 15, wherein the etching agent is an acid solution containing hydrofluoric acid or fluoroacetic acid.

17. The production method of a niobium powder for a capacitor as claimed in claim 15, wherein the etching agent is an alkali solution having a pH of 10 or more.

18. The production method of a niobium powder for a capacitor as claimed in claim 9, wherein the silicon nitride impregnated is a particle having an average particle size of 1 to 200 nm.

19. The production method of a niobium powder for a capacitor as claimed in claim 9, wherein ultrasonic irradiation is performed in the impregnation step.

20. A granulated niobium powder for a capacitor, obtained by granulating the niobium powder for a capacitor described in claim 1 above.

21. A granulated niobium powder for a capacitor, comprising a niobium layer not containing silicon nitride and a mixed layer of silicon nitride and niobium, the mixed layer being present in the vicinity of the outer surface and in the vicinity of the in-pore surface, wherein the thickness of the mixed layer is from 8 to 2,000 nm.

22. The granulated niobium powder for a capacitor as claimed in claim 21, wherein the silicon nitride content is from 50 to 500,000 mass ppm.

23. The granulated niobium powder for a capacitor as claimed in claim 20, wherein the average particle size is from 5 to 1,000 μm.

24. The granulated niobium powder for a capacitor as claimed in claim 20, wherein the specific surface area is from 0.5 to 40 m²/g.

25. The granulated niobium powder for a capacitor as claimed in claim 20, wherein one or more peak(s) of the pore diameter distribution is present in the range of 0.01 to 500 μm.

26. The granulated niobium powder for a capacitor as claimed in claim 23, wherein at least one peak of the pore diameter distribution is present in the range of 0.1 to 0.9 μm and at least one peak is present in the range of 0.9 to 3 μm.

27. A niobium sintered body for a capacitor, obtained by sintering the niobium powder for a capacitor claimed in claim 1.

28. A niobium sintered body for a capacitor, obtained by sintering the granulated niobium powder for a capacitor claimed in claim 20 above.

29. A niobium sintered body for a capacitor, comprising a niobium layer not containing silicon nitride and a mixed layer of silicon nitride and niobium, the mixed layer being present in the vicinity of the outer surface of the sintered body and in the vicinity of the in-pore surface, wherein the thickness of the mixed layer is from 8 to 2,000 nm.

30. The niobium sintered body for a capacitor as claimed in claim 29, wherein the silicon nitride content is from 50 to 500,000 mass ppm.

31. The niobium sintered body for a capacitor as claimed in claim 27 above, wherein the porosity is 55 vol % or more.

32. The niobium sintered body for a capacitor as claimed in claim 27, wherein the specific surface area is 0.006 m²/mm³ or more.

33. The niobium sintered body for a capacitor as claimed in claim 27, wherein the specific surface area is from 0.005 m²/mm³ to 0.06 m²/mm³.

34. The niobium sintered body for a capacitor as claimed in claim 27, wherein one or more peak of the pore diameter distribution is present in the range of 0.01 to 100 μm.

35. The niobium sintered body for a capacitor as claimed in claim 34, wherein at least one peak of the pore diameter distribution is present in the range of less than 1.0 μm and at least one peak is present in the range of 1.0 μm or more.

36. The niobium sintered body for a capacitor as claimed in claim 27 above, wherein the volume of pores having a diameter of 1 μm or more is 13 vol % or more of the entire pore volume.

37. The niobium sintered body for a capacitor as claimed in claim 27 above, wherein the capacitance is from 40,000 to 400,000 μFV/g.

38. A capacitor comprising the niobium sintered body for a capacitor claimed in claim 27 above as one electrode, a counter electrode and a dielectric material intervening between the electrodes.

39. The capacitor as claimed in claim 38, wherein the dielectric material mainly comprises niobium oxide containing silicon nitride.

40. The capacitor as claimed in claim 38, wherein the material for the counter electrode is at least one material selected from the group consisting of an electrolytic solution, an organic semiconductor and an inorganic semiconductor.

41. The capacitor as claimed in claim 40, wherein the organic semiconductor is at least one member selected from the group consisting of an organic semiconductor comprising benzopyrroline tetramer and chloranil, an organic semiconductor mainly comprising tetrathiotetracene, an organic semiconductor mainly comprising tetracyano-quinodimethane, and an electrically conducting polymer.

42. The capacitor as claimed in claim 41, wherein the electrically conducting polymer is at least one member selected from polypyrrole, polythiophene, polyaniline and substitution derivatives thereof.

43. The capacitor as claimed in claim 41, wherein the electrically conducting polymer is an electrically conducting polymer obtained by doping a dopant into a polymer containing a repeating unit represented by the following formula (1) or (2):

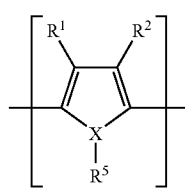

(1)

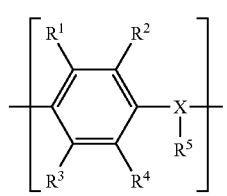

(2)

wherein $R^1$ to $R^4$ each independently represents a monovalent group selected from a hydrogen atom, a linear or branched, saturated or unsaturated alkyl, alkoxy or alkyl ester group having from 1 to 10 carbon atoms, a halogen atom, a nitro group, a cyano group, a primary, secondary or tertiary amino group, a $CF_3$ group, a phenyl group and a substituted phenyl group, the hydrocarbon chains of $R^1$ and $R^2$, or $R^3$ and $R^4$ may combine with each other at an arbitrary position to form a divalent group for forming at least one 3-, 4-, 5-, 6- or 7-membered saturated or unsaturated hydrocarbon cyclic structure together with the carbon atoms to which these substituent groups are bonded, the cyclic combined chain may contain, at an arbitrary position thereof, a carbonyl bond, an ether bond, an ester bond, an amido bond, a sulfido bond, a sulfinyl bond, a sulfonyl bond or an imino bond, X represents an oxygen atom, a sulfur atom or a nitrogen atom, and $R^5$ is present only when X is a nitrogen atom, and represents a hydrogen atom or a linear or branched, saturated or unsaturated alkyl group having from 1 to 10 carbon atoms.

44. The capacitor as claimed in claim 43, wherein the electrically conducting polymer is an electrically conducting polymer obtained by doping a dopant into a polymer containing a repeating unit represented by the following formula (3):

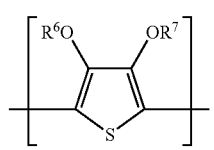

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

45. The capacitor as claimed in claim 44, wherein the electrically conducting polymer is an electrically conducting polymer obtained by doping a dopant into poly(3,4-ethylenedioxythiophene).

46. The capacitor as claimed in claim 38, wherein the material for the counter electrode has a layered structure at least in a partial portion.

47. The capacitor as claimed in claim 38, wherein the material for the counter electrode contains an organosulfonate anion as a dopant.

48. An electronic circuit using the capacitor claimed in claim 38.

49. An electronic device using the capacitor claimed in claim 38.

* * * * *